(12) United States Patent
Sakuyama et al.

(10) Patent No.: US 7,352,907 B2
(45) Date of Patent: Apr. 1, 2008

(54) CODE CONVERSION APPARATUS, CODE CONVERSION METHOD AND STORAGE MEDIUM

(75) Inventors: Hiroyuki Sakuyama, Tokyo (JP); Yasuyuki Nomizu, Kanagawa (JP); Junichi Hara, Kanagawa (JP); Taku Kodama, Kanagawa (JP); Nekka Matsuura, Kanagawa (JP); Yasuyuki Shinkai, Kanagawa (JP); Takanori Yano, Kanagawa (JP); Toshio Miyazawa, Kanagawa (JP); Takayuki Nishimura, Tottori (JP)

(73) Assignee: Ricoh Company, Ltd., Tokyo (JP)

( * ) Notice: Subject to any disclaimer, the term of this patent is extended or adjusted under 35 U.S.C. 154(b) by 885 days.

(21) Appl. No.: 10/647,337

(22) Filed: Aug. 26, 2003

(65) Prior Publication Data

US 2004/0126029 A1   Jul. 1, 2004

(30) Foreign Application Priority Data

Aug. 27, 2002   (JP) ............................. 2002-246912

(51) Int. Cl.
*G06K 9/36* (2006.01)
*G06K 9/46* (2006.01)

(52) U.S. Cl. ..................................... 382/240
(58) Field of Classification Search ............... 382/162, 382/166, 232, 233, 240, 244, 245, 264, 274, 382/304; 345/600–604; 358/1.16, 1.9, 3.23; 399/24, 27, 79
See application file for complete search history.

(56) References Cited

U.S. PATENT DOCUMENTS

| 6,571,071 | B2 | 5/2003 | Kanoshima et al. | |
| 7,158,682 | B2 * | 1/2007 | Sano | 382/236 |
| 2001/0050778 | A1 | 12/2001 | Fukuda et al. | |
| 2002/0051154 | A1 * | 5/2002 | Aneja et al. | 358/1.9 |
| 2002/0159644 | A1 | 10/2002 | Sakuyama | |
| 2003/0067627 | A1 * | 4/2003 | Ishikawa et al. | 358/1.15 |
| 2003/0095272 | A1 | 5/2003 | Nomizu | |
| 2003/0137695 | A1 | 7/2003 | Nomizu | |
| 2003/0151759 | A1 * | 8/2003 | Suzuki et al. | 358/1.13 |
| 2004/0126029 | A1 | 7/2004 | Sakuyama et al. | |
| 2004/0205199 | A1 * | 10/2004 | Gormish | 709/229 |
| 2005/0157599 | A1 * | 7/2005 | Kiyama et al. | 369/30.03 |

FOREIGN PATENT DOCUMENTS

| JP | 62-150475 | 7/1987 |
| JP | 2000-125293 | 4/2000 |
| JP | 2000-125294 | 4/2000 |

OTHER PUBLICATIONS

U.S. Appl. No. 10/372,479, filed Feb. 21, 2003, Unknown.

(Continued)

*Primary Examiner*—Amir Alavi
(74) *Attorney, Agent, or Firm*—Oblon, Spivak, McClelland, Maier & Neustadt, P.C.

(57) ABSTRACT

A code conversion apparatus includes an input section to input compressed and transformed input codes, a header information rewriting section to rewrite only header information within the codes so as to change a decoded state of the input codes, and an output section to output the codes, including rewritten header information, to a target object such as a display unit and an external equipment.

41 Claims, 41 Drawing Sheets

OTHER PUBLICATIONS

U.S. Appl. No. 10/647,337, filed Aug. 26, 2003, Sakuyama et al.
U.S. Appl. No. 10/390,193, filed Mar. 14, 2003, Unknown.
U.S. Appl. No. 10/390,263, filed Mar. 14, 2003, Unknown.
U.S. Appl. No. 10/348,444, filed Jan. 21, 2003, Nomizu.
U.S. Appl. No. 10/283,350, filed Oct. 30, 2002, Nomizu.
U.S. Appl. No. 10/082,308, filed Feb. 26, 2002, Sakuyama.
U.S. Appl. No. 09/847,192, filed May 2, 2001, Fukuda et al.
U.S. Appl. No. 09/725,569, filed Nov. 30, 2000, Namizuka et al.
U.S. Appl. No. 09/748,240, filed Dec. 27, 2000, Yoshizawa et al.
U.S. Appl. No. 09/748,262, filed Dec. 17, 2000, Namizuka et al.
U.S. Appl. No. 09/770,214, filed Jan. 29, 2001, Oteki et al.
U.S. Appl. No. 09/772,945, filed Jan. 31, 2001, Oteki et al.
U.S. Appl. No. 09/846,244, filed May 2, 2001, Shoji et al.
U.S. Appl. No. 09/855,665, filed May 16, 2001, Yamagata et al.
U.S. Appl. No. 09/912,364, filed Jul. 26, 2001, Sakuyama.
U.S. Appl. No. 09/940,589, filed Aug. 29, 2001, Inoue et al.
U.S. Appl. No. 09/962,580, filed Sep. 26, 2001, Saitoh et al.
U.S. Appl. No. 09/964,584, filed Sep. 28, 2001, Shinkai et al.
U.S. Appl. No. 10/102,633, filed Mar. 22, 2002, Ameyama et al.
U.S. Appl. No. 10/156,093, filed May 29, 2002, Sano et al.
U.S. Appl. No. 10/164,545, filed Jun. 10, 2002, Sano et al.
U.S. Appl. No. 10/272,857, filed Oct. 18, 2002, Watanabe et al.
U.S. Appl. No. 10/379,533, filed Mar. 6, 2003, Takeyama et al.
U.S. Appl. No. 10/986,781, filed Nov. 15, 2004, Matsuura et al.
U.S. Appl. No. 10/875,277, filed Jun. 25, 2004, Shoji et al.

* cited by examiner

FIG.3
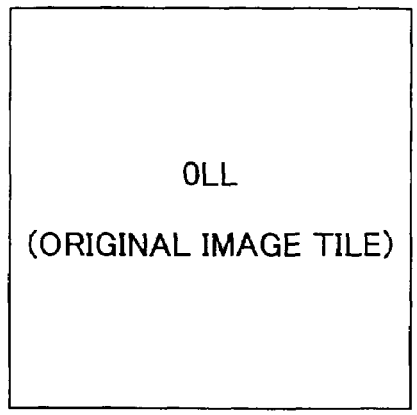
DECOMPOSITION_LEVEL1_0
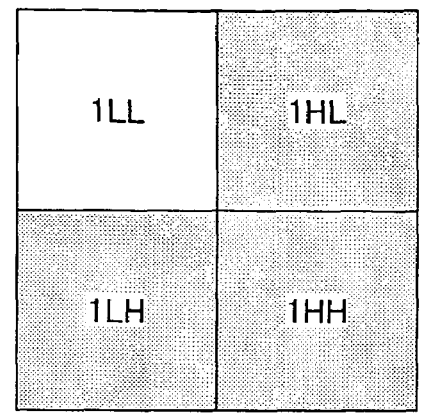
DECOMPOSITION_LEVEL1_1
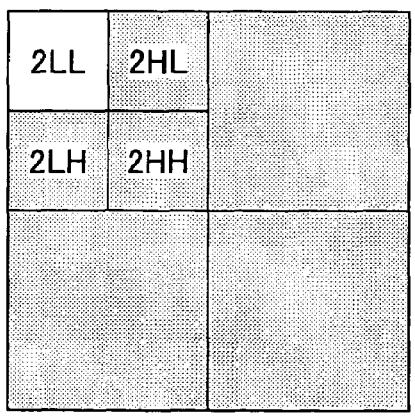
DECOMPOSITION_LEVEL1_2
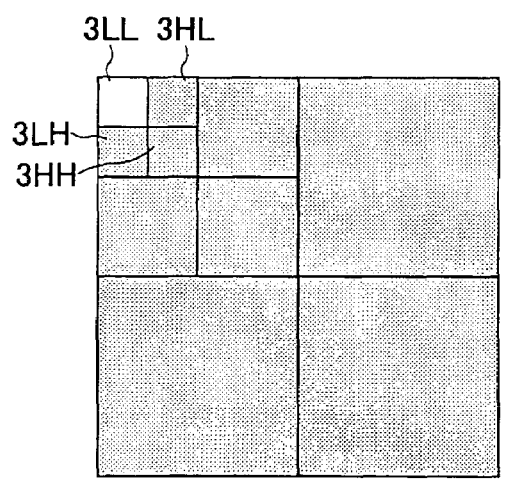
DECOMPOSITION_LEVEL1_3

FIG.9

| SOT | Lsot | Isot | Psot | TPsot | TNsot |

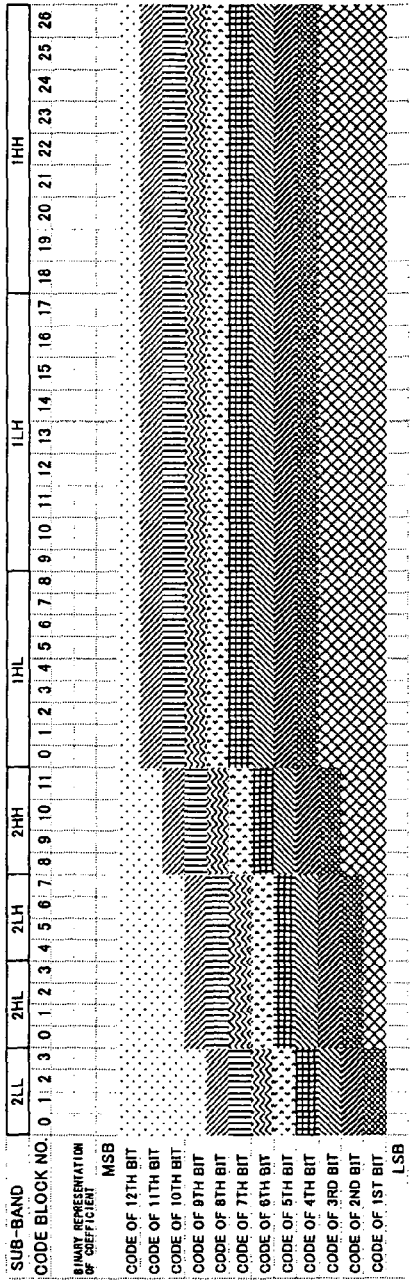
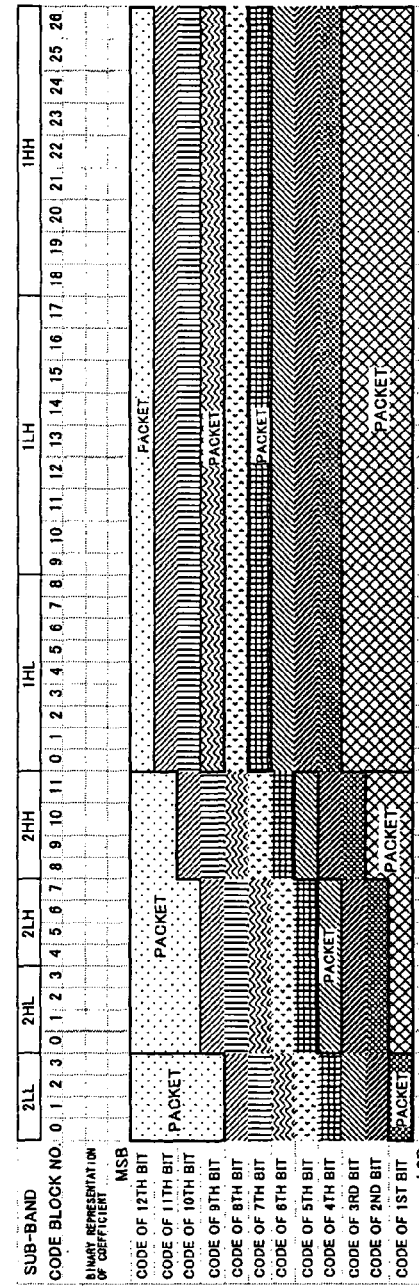
FIG.17A
FIG.17B

```
SOC    SIZ  Lsiz   Rsiz       Xsiz           Ysiz
[FF4F][FF51][002F][0000][0000 0010] [0000 0010]
      X0siz       Y0siz       XTsiz         YTsiz
   [0000 0000] [0000 0000]-[0000 0010] [0000 0010]
     XT0siz       YT0siz    Csiz Ssiz XR  YR Ssiz XR YR
   [0000 0000] [0000 00 00]-[0003][07][01][01]07   01 01
                              SGcod        SPcod
Ssiz XR YR COD    Lcod Scod pg  layer  ct lev cbw h sty 07 01  01 [FF52][000C][00] 00  0004  01 03 04 04 00
                  SPqcd
wt  QCO   Lqcd Sqcd LL HL LH HH HL LH HH HL LH HH
01[FF5C] 000D 20   50 58-58 60 58 58 60 58 58 60
 COM
[FF64] 00 0E 00 01 4B 61-6B 61 64 75 2D 33 2E 31
                                              SOD
FF 90 00 0A 00 00 00 00-03 5A 00 01[FF93] CF BC
18 05 03 83 BB F7 F2 C1-F3 04 0C 08 91 9B C3 E9
0A 0B 3A 86 79 2D C3 EC-05 87 D2 16 0F 98 20 03
BA 7C 4D 9D 04 B0 CF 47-34 0E 48 3B E2 C0 E0 A0
```

)

```
E0 EE D2 77 A9 D3 07 3F-EC 19 6E C9 6E A5 9E 9F
A9 A1 1E 37 55 36 1F A8-29 BB 0A 7F 1E 12 93 A3
                                           EOC
FE B2 60 E4 70 38 41 FB-09 83 [FFD9]
```

FIG.28

```
SOC    SIZ  Lsiz  Rsiz      Xsiz         Ysiz
[FF4F][FF51][002F][0000][0000 0010] [0000 0010]
     XOsiz        YOsiz     XTsiz        YTsiz
[0000 0000] [0000 0000]-[0000 0010] [0000 0010]
    XTOsiz       YTOsiz    Csiz Ssiz XR YR Ssiz XR YR
[0000 0000] [0000 00 00]-[0003] [07][01][01]07 01 01
                              SGcod     SPcod
Ssiz XR YR COD   Lcod Scod pg layer  ct lev cbw h sty 07 01 01 [FF52][000C][00]  00  0002  01 03 04 04 00
                   SPqcd
wt  QCO  Lqcd Sqcd LL HL LH HH HL LH HH HL LH HH
01[FF5C] 000D 20   50 58-58 60 58 58 60 58 58 60
COM
[FF64] 00 0E 00 01 4B 61-6B 61 64 75 2D 33 2E 31
                                       SOD
FF 90 00 0A 00 00 00 00-03 5A 00 01[FF93] CF BC
18 05 03 83 BB F7 F2 C1-F3 04 0C 08 91 9B C3 E9
0A 0B 3A 86 79 2D C3 EC-05 87 D2 16 0F 98 20 03
BA 7C 4D 9D 04 B0 CF 47-34 0E 48 3B E2 C0 E0 A0

(
                    )

E0 EE D2 77 A9 D3 07 3F-EC 19 6E C9 6E A5 9E 9F
A9 A1 1E 37 55 36 1F A8-29 BB 0A 7F 1E 12 93 A3
                                    EOC
FE B2 60 E4 70 38 41 FB-09 83 [FFD9]
```

FIG.29A
FIG.29B
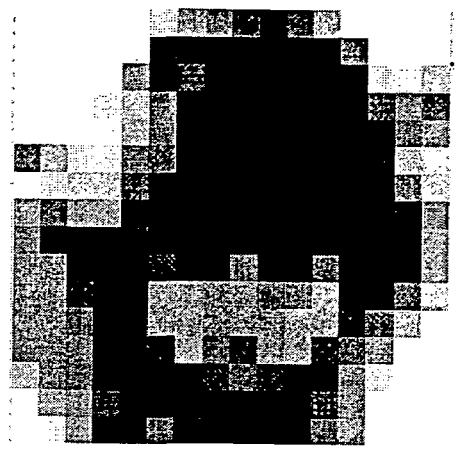
ORIGINAL IMAGE   4 LAYERS
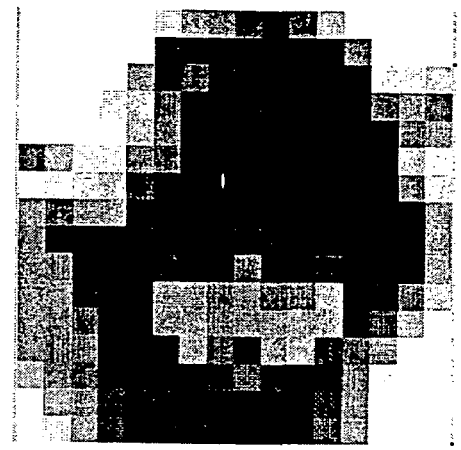
IMAGE DECODED   2 LAYERS
AFTER REWRITING

FIG.30

```
SOC   SIZ   Lsiz  Rsiz       Xsiz         Ysiz
[FF4F][FF51][002F][0000][0000 0010]  [0000 0010]

XOsiz        YOsiz       XTsiz        YTsiz
   [0000 0000]  [0000 0000]-[0000 0010]  [0000 0010]

XTOsiz        YTOsiz       Csiz Ssiz XR YR Ssiz XR YR
   [0000 0000]  [0000 00 00]-[0003][07][01][01]07 01 01

SGcod         SPcod

Ssiz XR YR   COD   Lcod Scod pg lay  ct  lev  cbw cbh sty 07 01  01   [FF52] 000C 00 -  01 0004 01  03   04  04  00

SPqcd wt  QCO  Lqcd Sqcd LL HL LH HH HL LH HH HL LH HH

01 [FF5C] 000D  20  50 58-58 60 58 58 60 58 58 60
COM
[FF64]00 0E 00 01 4B 61-6B 61 64 75 2D 33 2E 31
                                             SOD
FF 90 00 0A 00 00 00 00-03 5A 00 01 [FF93]CF BC
18 05 03 83 BB F7 F2 C1-F3 04 0C 08 91 9B C3 E9
0A 0B 3A 86 79 2D 80 80-80 80 80 80 C0 C0 C0 C3
                        (
                        ∫
                        )

E0 EE D2 77 A9 D3 07 3F-EC 19 6E C9 6E A5 9E 9F
A9 A1 1E 37 55 36 1F A8-29 BB 0A 7F 1E 12 93 A3
                                        EOC
FE B2 60 E4 70 38 41 FB-09 83 [FFD9]
```

FIG.31

```
SOC   SIZ    Lsiz   Rsiz     Xsiz          Ysiz
[FF4F][FF51][002F][0000] [0000 0008]   [0000 0008]

XOsiz        YOsiz      XTsiz         YTsiz
[0000 0000] [0000 0000]-[0000 0008]   [0000 0008]

XTOsiz       YTOsiz      Csiz Ssiz XR YR Ssiz XR YR
[0000 0000] [0000 00 00]-[0003][07][01][01]07   01 01

SGcod      SPcod

Ssiz XR YR   COD    Lcod Scod pg lay  ct  lev  cbw cbh sty 07 01   01   [FF52] 000C 00  -  01 0004 01 02  04 04 00

SPqcd wt  QCO   Lqcd  Sqcd   LL HL LH HH HL LH HH

01 [FF5C] 000A  20    50 58-58 60 58 58 60

COM
[FF64]00 0E 00 01 4B 61-6B 61 64 75 2D 33 2E 31
                                              SOD
FF 90 00 0A 00 00 00 00-03 5A 00 01 [FF93]CF BC
18 05 03 83 BB F7 F2 C1-F3 04 0C 08 91 9B C3 E9
0A 0B 3A 86 79 2D 80 80-80 80 80 80 C0 C0 C0 C3

(
                         )

E0 EE D2 77 A9 D3 07 3F-EC 19 6E C9 6E A5 9E 9F
A9 A1 1E 37 55 36 1F A8-29 BB 0A 7F 1E 12 93 A3
                                       EOC
FE B2 60 E4 70 38 41 FB-09 83 [FFD9]
```

FIG.32A
FIG.32B
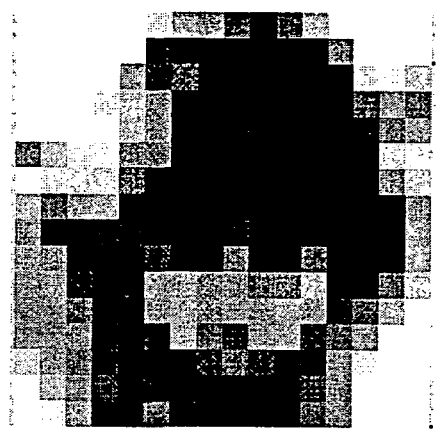
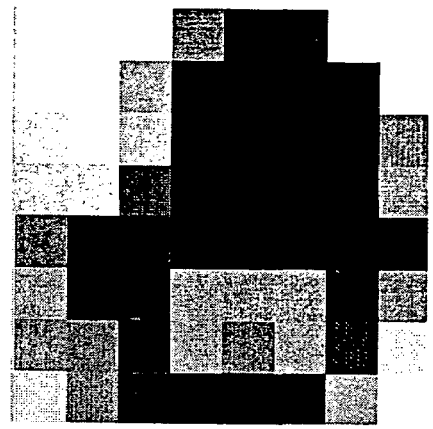
ORIGINAL IMAGE    DECOMPOSITION LEVEL 3      IMAGE DECODED AFTER REWRITING    DECOMPOSITION LEVEL2

FIG.33

```
 SOC    SIZ    Lsiz    Rsiz        Xsiz          Ysiz

[FF4F] [FF51] [002F] [0000] [0000 0010] [0000 0010]

XOsiz       YOsiz        XTsiz         YTsiz
  [0000 0000] [0000 0000]-[0000 0010] [0000 0010]

XTOsiz      YTOsiz     Csiz Ssiz XR YR  Ssiz XR YR

[0000 0000] [0000 00 00]-[0003][07][01][01] 07  01 01

SGcod         SPcod

Ssiz XR YR   COD   Lcod Scod pg lay  ct  lev cbw cbh sty 07   01 01  [FF52] 000C 00- 04 0004 01   03  04  04  00
                              SPqcd
  wt   QCO   Lqcd Sqcd  LL HL LH HH HL LH HH HL LH HH
  01  [FF5C] 000D  20   50 58-58 60 58 58 60 58 58 60
  COM
 [FF64] 00 0E 00 01 4B 61-6B 61 64 75 2D 33 2E 31
                                       SOD
 FF 90 00 0A 00 00 00 00-03 5A 00 01 [FF93] CF BC
 18 05 03 83 BB F7 F2 80-80 C0 C3 EC 05 87 D2 16
 0F 98 20 03 BA 7C 4D 9D-04 B0 CF 47 34 0E 48 3B
 E2 9F 00 20 6E 80 C1 D0-20 C7 D6 21 0F A4 84 3E
```

$\Big\{$

```
 E0 EE D2 77 A9 D3 07 3F-EC 19 6E C9 6E A5 9E 9F
 A9 A1 1E 37 55 36 1F A8-29 BB 0A 7F 1E 12 93 A3
                                         EOC
 FE B2 60 E4 70 38 41 FB-09 83 [FFD9]
```

FIG.34

```
SOC    SIZ    Lsiz    Rsiz         Xsiz           Ysiz

[FF4F] [FF51] [0029] [0000]   [0000 0010]    [0000 0010]

XOsiz        YOsiz         XTsiz          YTsiz
   [0000 0000]  [0000 0000]-[0000 0010]    [0000 0010]

XTOsiz       YTOsiz       Csiz  Ssiz  XR  YR

[0000 0000]  [0000 00 00]-[0001][07][01][01]

SGcod        SPcod

COD   Lcod  Scod  pg  lay   ct   lev  cbw  cbh  sty

[FF52] 000C  00-   04  0004  00   03   04   04   00
                                         SPqcd
   wt  QCO   Lqcd  Sqcd  LL  HL  LH  HH  HL  LH  HH  HL  LH  HH
   01 [FF5C] 000D   20   50  58- 58  60  58  58  60  58  58  60
   COM
   [FF64] 00 0E 00 01 4B 61-6B 61 64 75 2D 33 2E 31
                                                       SOD
   FF 90 00 0A 00 00 00 00-03 5A 00 01 [FF93] CF BC
   18 05 03 83 BB F7 F2 80-80 C0 C3 EC 05 87 D2 16
   0F 98 20 03 BA 7C 4D 9D-04 B0 CF 47 34 0E 48 3B
```

$\left\{\rule{0pt}{2em}\right.$

```
   E0 EE D2 77 A9 D3 07 3F-EC 19 6E C9 6E A5 9E 9F
   A9 A1 1E 37 55 36 1F A8-29 BB 0A 7F 1E 12 93 A3
                                                EOC
   FE B2 60 E4 70 38 41 FB-09 83 [FFD9]
```

ORIGINAL IMAGE  3 COMPONENTS   IMAGE DECODED AFTER REWRITING   1 COMPONENT

FIG.36

```
   SOC      SIZ     Lsiz   Rsiz      Xsiz          Ysiz

[FF4F] [FF51] [002F] [0000] [0000 0010]   [0000 0010]

XOsiz         YOsiz         XTsiz         YTsiz

[0000 0000]  [0000 0000]  [0000 0008]   [0000 0008]

XTOsiz      YTOsiz       Csiz Ssiz XR YR Ssiz XR YR
[0000 0000]  [0000 00 00]  -[0003][07][01][01]070101
                              SGcod       SPcod
Ssiz XR YR  COD    Lcod Scod pg lay ct lev cbw cbh sty
 07  01 01  [FF52] 000C 00-  00 0004 01 02 04  04  00
                        SPqcd
wt  QCO   Lqcd Sqcd LL HL LH HH HL LH HH COM
01 [FF5C]  000A 20 50 58-58 60 58 58 60 [FF64] 00
                                          SOT    Lsot
0E 00 01 4B 61 6B 61 64-75 2D 33 2E 31 [FF90][00
 Isot
0A][0000] 00 00 01 28 00-01 FF 93 CF BC 18 04 D3
E2 6C 1B 49 C1 F3 03 10-44 39 C0 C2 0B FB C3 EC
05 87 C6 12 0F 8C 18 0A-43 63 13 14 0F E3 C1 98
0F 1F D4 C0 C2 00 0B 30-C0 F8 02 00 0C 17 C1 E2
                         (
                         )
46 FC 61 FE 51 30 0F 90-60 53 BF C1 0D 88 71 25
48 CC 5F 77 38 6B 7D FF-44 08 C6 A8 9D 63 AF 92
               SOT    Lsot   Isot
40 C6 2A 0D 42 [FF90][000A][0001]00 00 01 31 00
01 FF 93 C7 D8 0A 03 D3-6E 81 94 C0 F0 60 0D AE
4B C0 F8 03 0E 27 E4 C7-D2 12 0F 98 24 3E 60 60
                         (
                         )
E2 7E 34 C6 38 97 0F 22-AF 38 6D 71 4F 79 96 40
FC 82 3E 51 50 3E A0 C0-2D DE 49 C3 DD DD 5D B1
67 AC 14 8D C7 BD E9 B8-3B E1 24 70 23 3F A5 35
                SOT    Lsot   Isot
38 49 5B 3B 0B 91 [FF90][000A][0002]00 00 01 46
00 01 FF 93 C7 D2 14 0D-FA 72 4L 43 C7 D2 10 0C
57 32 99 C7 CC 10 0B 61-46 C5 C3 E6 09 0F B0 16
0F 8C 18 0E 9D 8C 75 0B-91 0C C8 3D 0C 10 FA C1
                         (
                         )
E0 29 DD 44 98 69 44 5F-C8 FC 41 FE 41 3F 38 C0
D4 62 9F B3 C4 AB C0 F1-0C 96 0E C0 6C CE 41 0C
                                     SOT    Lsot
A3 E8 63 B9 43 5C AA FB-A9 2A 90 49 [FF90][000A]
Isot
[0003]00 00 01 48 00 01-FF 93 C7 D8 0A 06 84 51
0A 6C C3 E6 08 0C 0D 24-D4 C7 D8 0A 0B 67 3B C1
                         (
                         )
31 10 1F 38 E0 EE 2C 3A-69 09 62 CE 56 D3 88 0E
79 5E DB 34 F2 66 17 DC-9E 5B AE E9 32 6F 55 5C
F6 58 31 76 FF D9
```

FIG.37

```
SOC   SIZ    Lsiz  Rsiz     Xsiz         Ysiz

[FF4F][FF51][002F][0000][0000 0010] [0000 0008]

XOsiz      YOsiz        XTsiz        YTsiz

[0000 0000] [0000 0000]-[0000 0008] [0000 0008]
    XTOsiz      YTOsiz    Csiz Ssiz XR YR Ssiz XR YR
[0000 0000] [0000 00 00]-[0003][07][01][01]070101
                          SGcod      SPcod
Ssiz XR YR  COD  Lcod Scod pg lay ct lev cbw cbh sty
07 01 01   [FF52] 000C 00- 00 0004 01 02 04 04 00
                                SPqcd
wt  QCO  Lqcd Sqcd LL HL LH HH HL LH HH COM
01 [FF5C] 000A 20 50 58-58 60 58 58 60 [FF64] 00
                                           SOT  Lsot
OE 00 01 4B 61 6B 61 64-75 2D 33 2E 31 [FF90][00
   Isot
0A][0000] 00 00 01 28 00-01 FF 93 CF BC 18 04 D3
E2 6C 1B 49 C1 F3 03 10-44 39 C0 C2 0B FB C3 EC
05 87 C6 12 0F 8C 18 0A-43 63 13 14 0F E3 C1 98
                       ⌠
                       ⌡
46 FC 61 FE 51 30 0F 90-60 53 BF C1 0D 8B 71 25
48 CC 5F 77 38 6B 7D FF-44 08 C6 A8 9D 63 AF 92
            SOT  Lsot  Isot
40 C6 2A 0D 42 [FF90][000A][0001]00 00 01 31 00
01 FF 93 C7 D8 0A 08 D3-6E 81 94 C0 F0 60 0D AE
4B C0 F8 03 0E 27 E4 C7-D2 12 0F 98 24 3E 60 60
                       ⌠
                       ⌡
E2 7E 24 C6 38 97 0F 22-AF 38 6D 71 4F 79 96 40
FC 82 3E 51 50 3E A0 C0-2D DE 49 C3 DD DD 5D B1
67 AC 14 8D C7 BD E9 B8-3B E1 24 70 23 3F A5 35
            SOT  Lsot  Isot
38 49 5B 3B 0B 91 [FF90][000A][0002]00 00 01 46
00 01 FF 93 C7 D2 14 0D-FA 72 41 43 C7 D2 10 0C
57 32 99 C7 CC 10 0B 61-46 C5 C3 E6 09 0F B0 16
                       ⌠
                       ⌡
E0 29 DD 44 98 69 44 5F-CB FC 41 FE 41 3F 38 C0
D4 62 9F B3 C4 AB C0 F1-0C 96 0E C0 6C CE 41 0C
                                           SOT  Lsot
A3 E8 53 B9 43 5C AA FB-A9 2A 90 49 [FF90][000A]
Isot
[0003]00 00 01 48 00 01-FF 93 C7 D8 0A 06 84 51
0A 6C C3 E6 08 0C 0D 24-D4 C7 D8 0A 0B 67 3B C1
38 C7 DE 09 0F B0 16 0F-8C 18 0F D3 91 7E 0C 4B
                       ⌠
                       ⌡
31 10 1F 38 E0 EE 2C 3A-69 09 62 CE 56 D3 88 0E
79 5E DB 34 F2 66 17 DC-9E 5B AE E9 32 6F 55 5C
F6 58 31 76 FF D9
```

FIG.38A
FIG.38B
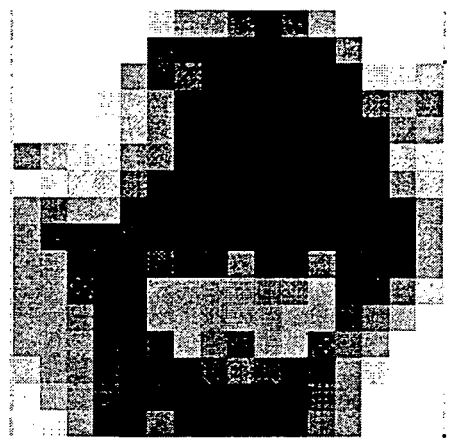
ORIGINAL IMAGE    4 TILES
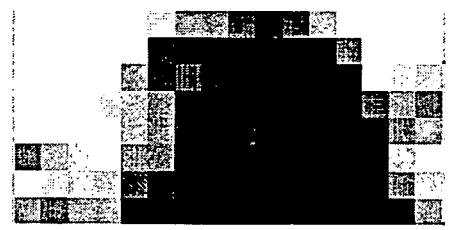
IMAGE DECODED
AFTER REWRITING    2 TILES

FIG.39

```
SOC  SIZ  Lsiz  Rsiz        Xsiz          Ysiz

[FF4F][FF51][002F][0000][0000 0010]  [0000 0008]

XOsiz     YOsiz       XTsiz         YTsiz

[0000 0000] [0000 0000]-[0000 0008]  [0000 0008]

XTOsiz     YTOsiz      Csiz Ssiz XR YR Ssiz XR YR
[0000 0000] [0000 00 00]-[0003][07][01][01]070101
                           SGcod        SPcod
Ssiz XR YR  COD  Lcod Scod pg lay ct lev cbw cbh sty
 07  01 01 [FF52] 000C  00- 00 0004 01 02 04  04  00
                           SPqcd
wt  QCO  Lqcd Sqcd LL HL LH HH HL LH HH COM
01 [FF5C] 000A  20  50 58-58 60 58 68 60 [FF64] 00
                                              SOT  Lsot
0E 00 01 4B 61 6B 61 64-75 2D 33 2E 31 [FF90][00

Isot

0A][0001] 00 00 01 28 00-01 FF 93 CF BC 18 04 D3

E2 6C 1B 49 C1 F3 03 10-44 39 C0 C2 0B FB C3 EC
05 87 C6 12 0F 8C 18 0A-43 63 13 14 0F E3 C1 98
                        )

46 FC 61 FE 51 30 0F 90-60 53 BF C1 0D 8B 71 25
48 CC 5F 77 38 6B 7D FF-44 08 C6 A8 9D 63 AF 92
             SOT  Lsot  Isot

40 C6 2A 0D 42 [FF90][000A][0000]00 00 01 31 00

01 FF 93 C7 D8 0A 08 D3-6E 81 94 C0 F0 60 0D AE
4B C0 F8 03 0E 27 E4 C7-D2 12 0F 98 24 3E 60 60
                        )

FC 82 3E 51 50 3E A0 C0-2D DE 49 C3 DD DD 5D B1
67 AC 14 8D C7 BD E9 B8-3B E1 24 70 23 3F A5 35
             SOT  Lsot Isot
38 49 5B 3B 0B 91 [FF90][000A][0002]00 00 01 46
00 01 FF 93 C7 D2 14 0D-FA 72 41 43 C7 D2 10 0C
57 32 99 C7 CC 10 0B 61-46 C5 C3 E6 09 0F B0 16
                        )

E0 29 DD 44 98 69 44 5F-CB FC 41 FE 41 3F 38 C0
D4 62 9F B3 C4 AB C0 F1-0C 96 0E C0 6C CE 41 0C
                                        SOT  Lsot
A3 E9 53 B9 43 5C AA FB-A9 2A 90 49 [FF90][000A]
Isot
[0003]00 00 01 48 00 01-FF 93 C7 D8 0A 06 84 51
0A 6C C3 E6 08 0C 0D 24-D4 C7 D8 0A 0B 67 3B C1
                        )

79 5E DB 34 F2 66 17 DC-9E 5B AE E9 32 6F 55 5C
F6 58 31 76 FF D9
```

ORIGINAL IMAGE    4 TILES

IMAGE DECODED
AFTER REWRITING    2 TILES
(RIGHT & LEFT REVERSED)

```
       SOC   SIZ    Lsiz   Rsiz        Xsiz           Ysiz
     [FF4F][FF51][0029][0000][0000 0010]  [0000 0010]

XOsiz       YOsiz       XTsiz        YTsiz
     [0000 0000] [0000 0000]-[0000 0010][ 0000 0010]

XTOsiz      YTOsiz   Csiz  Ssiz XR YR   QCD  Lqcd
     [0000 0000] [0000 0000]-[0001][07][01][01][FF5C][00
        SPqcd                                      SPcod LL HL LH HH  COD   Lcod Scod          lev 07]40 40 48 48 5C [FF52][000C][00] 00 00 01 00 01
                       COM
     04 04 00 01 [FF64]00 25-00 01 43 72 65 61 74 65
     64 20 62 79 20 52 4A 32-4B 20 76 65 72 73 69 6F
                                             SOT
     6E 20 30 2E 31 30 2E 33-28 30 29 [FF90]00 0A 00
                   SOD
     00 00 00 00 EC 00 01[FF-93] CF B4 F0 1B 0B F9 AF
     13 06 8B 5C 95 4E E8 D6-AD 2B B5 13 3F 8E A7 20
     92 96 D6 BD BA 5C 3E DA-A3 0A AF 3F 5D 93 F4 40
     CE 91 16 2E ED A3 0B 55-60 41 63 2D 47 3E 5F 88
     6A DC 04 4F 96 80 A8 1B-C3 EA 30 87 D4 69 03 E7
     64 61 FC 4E 8B 26 43 46-6A D1 5E CB 3D 5C 09 10
     1B 0B BD EE 4A 0F 80 4C-03 1E 0D 17 BD FD A7 60
     DC 8D 13 3B 48 E9 2E 54-DC 3B 00 25 11 0D 36 83
     30 1C 76 1D E7 83 C6 ED-2F 89 D4 C1 78 17 09 41
     60 4D BE 25 89 34 71 68-97 60 A6 E5 48 54 FC E9
     18 EE 2B AB BE CC 99 C7-C0 02 71 C2 B5 77 9A 90
     1D FD E3 9F 9A 15 F3 2E-FE 86 AF 20 52 28 26 40
     FB FD 36 99 E6 51 E0 01-1F 02 E2 34 4F E7 CA A3
     0D BF 5F FE 7A 96 9B 57-D4 D1 27 53 D8 EF 18 7E
                       EOC
     92 38 94 43 40 87 E8 [FF-D9]
```

RESOLUTION INCREASED BY 4 TIMES BY PRESENT INVENTION (64 × 64 PIXELS)

RESOLUTION INCREASED BY 2 TIMES BY PRESENT INVENTION (32 × 32 PIXELS)

RESOLUTION INCREASED BY 2 TIMES BY 3RD ORDER INTERPOLATION (32 × 32 PIXELS)

ORIGINAL IMAGE (16 × 16 PIXELS)

CODE CONVERSION APPARATUS, CODE CONVERSION METHOD AND STORAGE MEDIUM

BACKGROUND OF THE INVENTION

This application claims the benefit of a Japanese Patent Application No.2002-246912 filed Aug. 27, 2002, in the Japanese Patent Office, the disclosure of which is hereby incorporated by reference.

1. Field of the Invention

The present invention generally relates to, and more particularly to code conversion apparatuses, code conversion methods and storage media, and more particularly to a code conversion apparatus and a code conversion method for converting coded image information, and to a computer-readable storage medium which stores a computer program for causing a computer to carry out such a code conversion of the coded image information.

2. Description of the Related Art

It is anticipated that the demands to further improve the performance and multi-functions of the image compression and expansion techniques for facilitating the processing of high-definition still images will continue to increase. Presently, the Joint Photographic Experts Group (JPEG) is most popularly used as the image compression and expansion algorithm for facilitating the processing of the high-definition still images. In addition, the use of the Discrete Wavelet Transform (DWT) in place of the Discrete Cosine Transform (DCT) which is used by JPEG, is increasing. The image compression and expansion technique called JPEG2000 is a typical example, which has become an international standard in 2001 to succeed the JPEG.

There are various forms of use and states of use of the image data which is subjected to the compression and expansion by the JPEG2000 or the like. For example, an image file provider (or manager) may provide image files to the user via the Internet on an accounting (or charging) system basis. In this case, the image file is distributed in the form of a sample image for confirmation, and the size and/or the resolution of this sample image is intentionally reduced so as not to enable complete viewing of the image file. The actual image file having the enlarged size and/or high resolution is distributed to the user only after the user purchases the image file by viewing the sample image. Moreover, the image which may be displayed on a display device of a terminal may be restricted by the performance of the display device. In this case, an original full-color image may only be displayed on the display device as a monochrome image or, the size and/or the resolution of the original image may only be displayed on the display device with a reduced size and/or resolution, due to the limited performance of the display device.

Therefore, although the JPEG2000 is a compression and expansion technique which can send the original image with a high reproducibility, the expansion (or decoding) of the original image in the original form may not always be desired, depending on the purpose or usage of the image data.

For example, suppose that a code A which is obtained by compressing a first image is to be converted into a code B which is obtained by compressing a second image having ½ the resolution of the first image, where the first and second images relate to the same image but have mutually different resolutions. In general, this conversion may be realized by a procedure which (i) expands (decodes) the code A, (ii) converts the resolution of the decoded image, and (iii) compresses (encodes) the decoded image having the converted resolution into the code B. However, such a procedure requires a troublesome and time-consuming process. In addition, unnecessary picture quality deterioration may be introduced due to an inverse quantization or the like which are required by the procedure. Furthermore, since the decoded image having the converted resolution needs to be compressed (encoded) again, this compression may be different from the compression which is carried out with respect to the first image when obtaining the code A, and it may become impossible to expand (decode) the code B back into the original first image.

Accordingly, the present inventors have found that it would be convenient if it is possible to create the code B by simply editing the code A in the encoded state, because this would not require the encoding and decoding and thereby shorten the processing time, and would not require the inverse quantization and thereby prevent unnecessary picture quality deterioration. Moreover, the present inventors have found that it would be more convenient if the original code A can be restored by simply editing the code B in the encoded state, since this would have the effect of concealing a portion of the code A from the user.

The DWT may also be regarded as a method of converting the resolution into $2^n$ having a high picture quality, and methods of obtaining from the code an image having a lower resolution that the original image have been proposed in Japanese Laid-Open Patent Applications No.2000-125293 and No.2000-125294, for example. The Japanese Laid-Open Patent Applications No.2000-125293 and No.2000-125294 not only describe the methods of converting the resolution into $2^n$, but also describe the methods of converting the resolution into an arbitrary resolution. But the methods proposed in the Japanese Laid-Open Patent Applications No.2000-125293 and No.2000-125294 are applied to cases where the user himself desires to convert the resolution, and it is originally possible to decode the code back into the original image. For this reason, these proposed methods are unsuited for application to an accounting system, such as that described above where the provider of the image data desires to intentionally convert the resolution or the like when providing the data to the user.

Various methods, including the proposed methods described above, have been proposed to reduce the resolution or the size of the image. However, not much research has been made on methods of generating an image having a resolution higher than that of the original image, probably because it is conceivable to carry out an interpolation after decoding of the code, by an existing interpolation method such as the cubic convolution method which is a kind of third order interpolation method. However, in the individual apparatus which processes the image, the picture quality obtainable by the algorithm used for the interpolation may be insufficient. Such a situation occurs when the interpolation algorithm is limited to the simple nearest neighbor method, and not the cubic convolution method, due to priority placed on the computation speed.

Accordingly, the present inventors have found that it would be convenient if it is possible to simply enlarge the size and/or increase the resolution of the image in an existing apparatus having the basic structure of the JPEG2000, and not having a high-speed and high-performance processing circuit which uses the cubic convolution method as the third order interpolation method.

SUMMARY OF THE INVENTION

Accordingly, it is a general object of the present invention to provide a novel and useful code conversion apparatus, code conversion method and computer-readable storage medium, in which the problems described above are eliminated.

Another and more specific object of the present invention is to provide a code conversion apparatus, code conversion method and computer-readable storage medium, which can decode an encoded original image into a state having a resolution or the like which is different from that of the original image, by carrying out an editing process with respect to the encoded original image, simply using an existing DWT or the like.

Still another specific object of the present invention is to provide a code conversion apparatus, code conversion method and computer-readable storage medium, which can decode an encoded original image into a state having a resolution or the like which is deteriorated compared to that of the original image, by carrying out an editing process with respect to the encoded original image, simply using an existing DWT or the like, so as to enable application to an accounting system.

A further specific object of the present invention is to provide a code conversion apparatus, a code conversion method and computer-readable storage medium, which can decode an encoded original image into a state having a resolution or the like which is improved compared to that of the original image, by carrying out an editing process with respect to the encoded original image, simply using an existing DWT or the like.

Still another and more specific object of the present invention is to provide a code conversion apparatus comprising input means for inputting compressed and transformed input codes; header information rewriting means for rewriting only header information within the codes so as to change a decoded state of the input codes; and output means for outputting the codes, including rewritten header information, to a target object. According to the code conversion apparatus of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like.

A further object of the present invention is to provide a code conversion apparatus comprising an input section to input compressed and transformed input codes; a header information rewriting section to rewrite only header information within the codes so as to change a decoded state of the input codes; and an output section to output the codes, including rewritten header information, to a target object. According to the code conversion apparatus of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like.

Another object of the present invention is to provide a code conversion apparatus comprising input means for inputting compressed and transformed input codes; header information rewriting means for rewriting only header information within the codes so as to partially decode the input codes; and output means for outputting the codes, including rewritten header information, to a target object. According to the code conversion apparatus of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the partial decoding, that is, the decoding to a state more deteriorated from the original image, is carried out as a particular example of changing the decoded state, it is possible to suitably apply the present invention to an accounting system. In other words, it is possible to rewrite the header information of the codes and at the same time maintain the code information other than the header information in the original state, so as to carry out the encoding which enables decoding of codes which are less than the maintained codes, and simply secure the effect of concealing a portion of the original codes from the user.

Still another object of the present invention is to provide a code conversion apparatus comprising an input section to input compressed and transformed input codes; a header information rewriting section to rewrite only header information within the codes so as to partially decode the input codes; and an output section to output the codes, including rewritten header information, to a target object. According to the code conversion apparatus of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the partial decoding, that is, the decoding to a state more deteriorated from the original image, is carried out as a particular example of changing the decoded state, it is possible to suitably apply the present invention to an accounting system. In other words, it is possible to rewrite the header information of the codes and at the same time maintain the code information other than the header information in the original state, so as to carry out the encoding which enables decoding of codes which are less than the maintained codes, and simply secure the effect of concealing a portion of the original codes from the user.

A further object of the present invention is to provide a code conversion apparatus comprising input means for inputting compressed and transformed input codes of an original image; header information rewriting means for rewriting only header information within the codes so as to decode the codes into an image having a higher resolution than the original image; and output means for outputting the codes, including rewritten header information, to a target object. According to the code conversion apparatus of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the decoding to a state having a higher resolution than the original image is carried out as a particular example of changing the decoded state, it is possible to decode to the state having the higher resolution than the original image by simply utilizing the existing discrete wavelet inverse transform or the like, even in the case of a system structure having no high-order and high-performance multiplication process circuit employing a method such as the third order interpolation method.

Another object of the present invention is to provide a code conversion apparatus comprising an input section to input compressed and transformed input codes of an original image; a header information rewriting section to rewrite only header information within the codes so as to decode the codes into an image having a higher resolution than the original image; and an output section to output the codes, including rewritten header information, to a target object. According to the code conversion apparatus of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the decoding to a state having a higher resolution than the original image is carried out as a particular example of changing the decoded state, it is possible to decode to the state having the higher resolution than the original image by simply utilizing the existing discrete wavelet inverse transform or the like, even in the case of a system structure having no high-order and high-performance multiplication process circuit employing a method such as the third order interpolation method.

Still another object of the present invention is to provide a code conversion method comprising the steps of (a) inputting compressed and transformed input codes; (b) rewriting only header information within the codes so as to change a decoded state of the input codes; and (c) outputting the codes, including rewritten header information, to a target object. According to the code conversion method of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like.

A further object of the present invention is to provide a code conversion method comprising the steps of (a) inputting compressed and transformed input codes; (b) rewriting only header information within the codes so as to partially decode the input codes; and (c) outputting the codes, including rewritten header information, to a target object. According to the code conversion method of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the partial decoding, that is, the decoding to a state more deteriorated from the original image, is carried out as a particular example of changing the decoded state, it is possible to suitably apply the present invention to an accounting system. In other words, it is possible to rewrite the header information of the codes and at the same time maintain the code information other than the header information in the original state, so as to carry out the encoding which enables decoding of codes which are less than the maintained codes, and simply secure the effect of concealing a portion of the original codes from the user.

Another object of the present invention is to provide a code conversion method comprising the steps of (a) inputting compressed and transformed input codes of an original image; (b) rewriting only header information within the codes so as to decode the codes into an image having a higher resolution than the original image; and (c) outputting the codes, including rewritten header information, to a target object. According to the code conversion method of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the decoding to a state having a higher resolution than the original image is carried out as a particular example of changing the decoded state, it is possible to decode to the state having the higher resolution than the original image by simply utilizing the existing discrete wavelet inverse transform or the like, even in the case of a system structure having no high-order and high-performance multiplication process circuit employing a method such as the third order interpolation method.

Still another object of the present invention is to provide a computer-readable storage medium which stores a program for causing a computer to carry out a code conversion process, the program comprising an input procedure causing the computer to input compressed and transformed input codes; a header information rewriting procedure causing the computer to rewrite only header information within the codes so as to change a decoded state of the input codes; and an output procedure causing the computer to output the codes, including rewritten header information, to a target object. According to the computer-readable storage medium of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like.

A further object of the present invention is to provide a computer-readable storage medium which stores a program for causing a computer to carry out a code conversion process, the program comprising an input procedure causing the computer to input compressed and transformed input codes; a header information rewriting procedure causing the computer to rewrite only header information within the codes so as to partially decode the input codes; and an output procedure causing the computer to output the codes, including rewritten header information, to a target object. According to the computer-readable storage medium according to the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the partial decoding, that is, the decoding to a state more deteriorated from the original image, is carried out as a particular example of changing the decoded state, it is possible to suitably apply the present invention to an accounting system. In other words, it is possible to rewrite the header information of the codes and at the same time maintain the code information other than the header information in the original state, so as to carry out the encoding which enables decoding of codes which are less than the maintained codes, and simply secure the effect of concealing a portion of the original codes from the user.

Another object of the present invention is to provide a computer-readable storage medium which stores a program for causing a computer to carry out a code conversion process, the program comprising an input procedure causing the computer to input compressed and transformed input codes of an original image; a header information rewriting procedure causing the computer to rewrite only header information within the codes so as to decode the codes into an image having a higher resolution than the original image; and an output procedure causing the computer to output the codes, including rewritten header information, to a target object. According to the computer-readable storage medium of the present invention, by noting that the decoding of the codes is restricted by the information in the header information which is included within the codes, only the header information is forcibly rewritten so as to change the decoded state of the codes while maintaining the codes other than the header information unchanged. As a result, the codes can be decoded to a state having a resolution level or the like which is different from that of the original image, by carrying out an editing process in the encoded state simply utilizing the existing discrete wavelet inverse transform or the like. In addition, since the decoding to a state having a higher resolution than the original image is carried out as a particular example of changing the decoded state, it is possible to decode to the state having the higher resolution than the original image by simply utilizing the existing discrete wavelet inverse transform or the like, even in the case of a system structure having no high-order and high-performance multiplication process circuit employing a method such as the third order interpolation method.

Other objects and further features of the present invention will be apparent from the following detailed description when read in conjunction with the accompanying drawings.

BRIEF DESCRIPTION OF THE DRAWINGS

FIG. 3 is a diagram for explaining sub-bands at each decomposition level when there are three decomposition levels;

FIG. 9 is a diagram showing a structure of an SOT marker segment;

FIGS. 17A and 17B are diagrams for explaining a relationship of a layer and a packet;

FIG. 26 is a diagram for explaining a binary representation of an original code of Example 1;

FIG. 27 is a diagram for explaining the original code added with a tag representation;

FIG. 28 is a diagram for explaining the code after rewriting the header information;

FIGS. 29A and 29B are diagrams for explaining images before and after the number of layers is changed;

FIG. 30 is a diagram for explaining an original code of Example 2 added with a tag representation;

FIG. 31 is a diagram for explaining the code after rewriting the header information;

FIGS. 32A and 32B are diagrams for explaining images before and after the decomposition level is changed;

FIG. 33 is a diagram for explaining an original code of Example 3 added with a tag representation;

FIG. 34 is a diagram for explaining the code after rewriting the header information;

FIG. 36 is a diagram for explaining an original code of Example 4 added with a tag representation;

FIG. 37 is a diagram for explaining the code after rewriting the header information;

FIGS. 38A and 38B are diagrams for explaining images before and after the number of tiles is changed;

FIG. 39 is a diagram for explaining a code of Example 5 after rewriting the header information;

FIG. 41 is a diagram for explaining a binary representation of a code of Example 6;

FIG. 42 is a diagram for explaining the original code added with a tag representation;

FIG. 43 is a diagram for explaining the code after rewriting the header information;

FIG. 44 is a diagram for explaining the code after a different rewriting of the header information;

DESCRIPTION OF THE PREFERRED EMBODIMENTS

As described above, in a case where a code A which is obtained by compressing a first image is to be converted into a code B which is obtained by compressing a second image having 1/2 the resolution of the first image, for example, where the first and second images relate to the same image but have mutually different resolutions, the present inventors have found that it would be convenient if it is possible to create the code B by simply editing the code A in the encoded state, because this would not require the encoding and decoding and thereby shorten the processing time, and would not require the inverse quantization and thereby prevent unnecessary picture quality deterioration. Moreover, the present inventors have found that it would be more convenient if the original code A can be restored by simply editing the code B in the encoded state, since this would have the effect of concealing a portion of the code A from the user.

Furthermore, as also described above, the present inventors have found that it would be convenient if it is possible to simply enlarge the size and/or increase the resolution of the image in an existing apparatus having the basic structure of the JPEG2000,mand not having a high-speed and high-performance processing circuit which uses the cubic convolution method as the third order interpolation method.

First, a general description will be given of the JPEG2000 algorithm which is used in the embodiments which will be described hereunder, so as to facilitate the understanding of the present invention.

Figure 1:
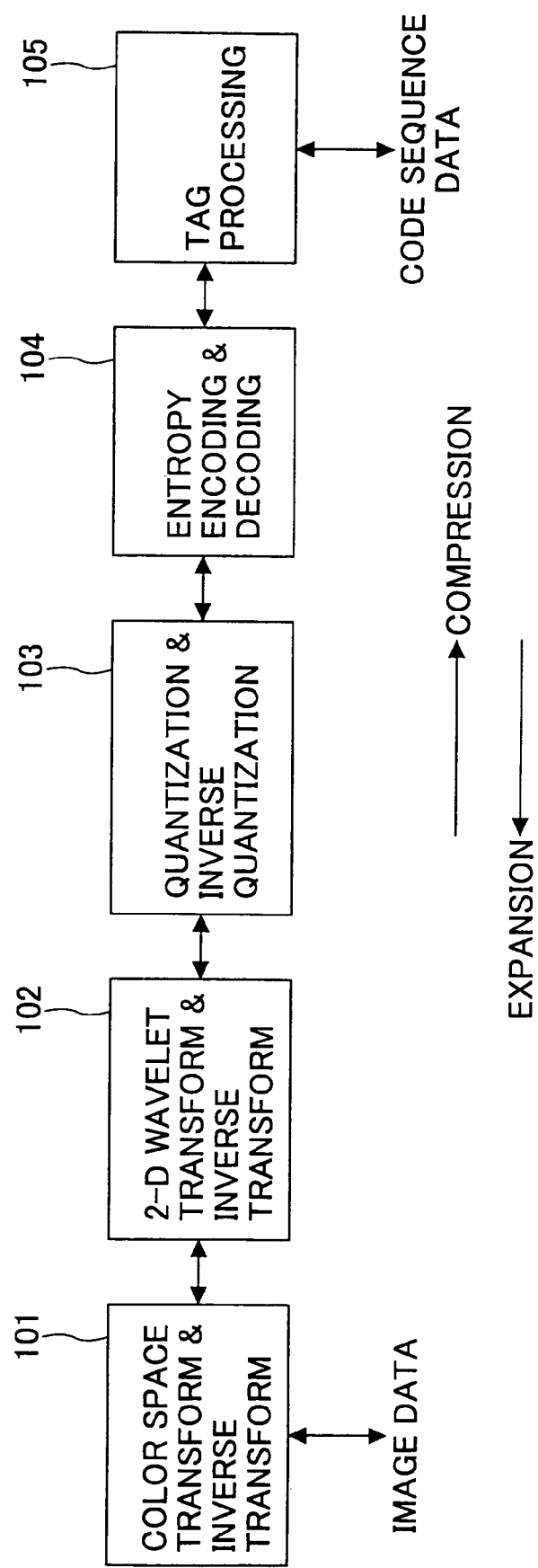
FIG. 1 is a functional block diagram showing a system for realizing the hierarchical encoding algorithm which forms a basis of the JPEG2000 which is used in the embodiments.

FIG. 1 is a functional block diagram showing a system for realizing the hierarchical encoding algorithm which forms a basis of the JPEG2000 which is used in the embodiments. The system shown in FIG. 1 includes a color space transform and inverse transform section 101, a two-dimensional wavelet transform and inverse transform section 102, a quantization and inverse quantization section 103, an entropy encoding and decoding section 104, and a tag processing section 105.

The system shown in FIG. 1 greatly differs from the conventional JPEG algorithm on several points. One differing point of the system shown in FIG. 1, compared to the JPEG algorithm, is the transformation algorithm used. Although the JPEG algorithm uses the Discrete Cosine Transform (DCT), the hierarchical encoding algorithm uses the Discrete Wavelet Transform (DWT) in the two-dimensional wavelet transform and inverse transform section 102. The DWT has an advantage over the DCT in that the picture quality in the high compression region is improved, and this is one of the reasons the DWT is used the JPEG2000 algorithm which is to succeed the JPEG algorithm.

Another differing point of the system shown in FIG. 1, compared to the JPEG, is the provision of the tag processing section 105 at the final stage of the system to form the code. In the tag processing section 105, compressed data is generated as code sequence data at the time of image compression, and code sequence data necessary for the expansion is interpreted at the time of the image expansion. The JPEG2000 can realize various convenient functions by use of the code sequence data. For example, it is possible to freely stop the compression and expansion operation with respect to the still image at an arbitrary hierarchical level (decomposition level) corresponding to an octave division of the block-based DWT, as will be described later with reference to FIG. 3. In addition, it is possible to carry out operations such as obtaining a low-resolution image (or a reduced image) from one file, and obtaining a part (tiling image) of the image.

The color space transform and inverse transform section 101 is connected in most cases to the input and output section with respect to the original image. For example, the RGB calorimetric system made up of each of the red (R), green (G) and blue (B) components of the primary color system or, the YMC calorimetric system made up of each of the yellow (Y), magenta (M) and cyan (C) components of the complementary color system, is subjected to the transform or inverse transform to the YUV calorimetric system or the YCbCr calorimetric system.

Figure 2:
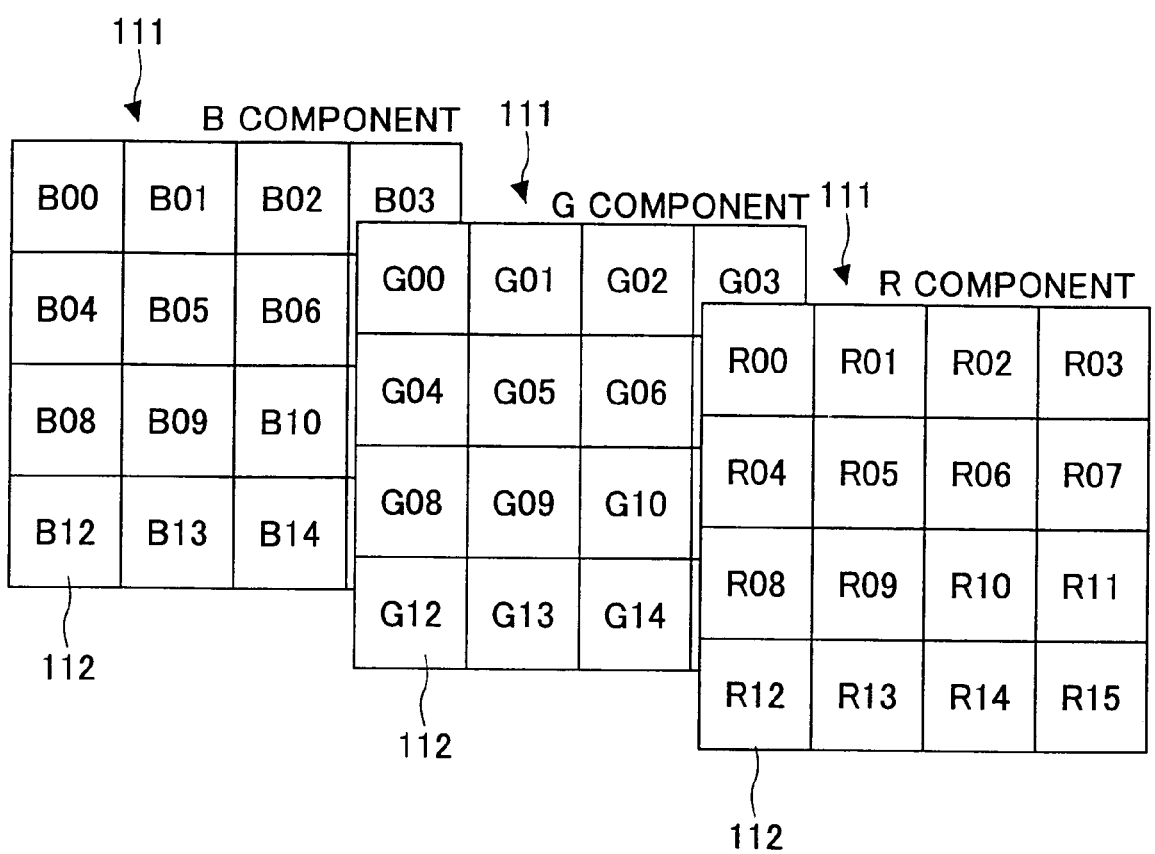
FIG. 2 is a diagram showing divided rectangular regions of each of color components of an original image.

Next, a description will be given of the algorithm of the JPEG 2000. FIG. 2 is a diagram showing divided rectangular regions of each of the color components of the original image. As shown in FIG. 2, each of the R, G and B components 111 (of the RGB primary color system) of the original image is divided into rectangular regions. Each rectangular region is generally referred to as a block or a tile. The rectangular region is generally referred to as the tile in the case of the JPEG2000, and thus, the rectangular region will hereinafter be referred to as the tile. In the particular case shown in FIG. 2, each component 111 is divided into four tiles 112 in the vertical direction and four tiles 112 in the horizontal direction, that is, a total of 16 (=4×4) tiles 112. The R component 111 is made up of tiles R00, R01, . . . , R15, the G component 111 is made up of tiles G00, G01, . . . , G15, and the B component 111 is made up of tiles B00, B01, . . . , B15. The tile forms the basic unit when carrying out the compression and expansion process with respect to the image data. Hence, the compression and expansion of the image data is carried out independently for each component 111 and for each tile 112.

When encoding the image data, the data of each tile 112 of each component 111 is input to the color space transform and inverse transform section 101 shown in FIG. 1. After the data is subjected to the color space transform, a two-dimensional wavelet transform (forward transform) is carried out in the two-dimensional wavelet transform and inverse transform section 102, so as to spatially divide the data into frequency bands.

FIG. 3 is a diagram for explaining sub-bands at each decomposition level when there are three decomposition levels. With respect to a tile original image 0LL (decomposition level 0) obtained by dividing the original image into the tiles, the two-dimensional wavelet transform is carried out to separate sub-bands 1LL, 1HL, 1LH and 1HH indicated by a decomposition level 1. Then, with respect to a low-frequency component 1LL in this hierarchical level, the two-dimensional wavelet transform is carried out to separate sub-bands 2LL, 2HL, 2LH and 2HH indicated by a decomposition level 2. Similarly thereafter, the two-dimensional wavelet transform is carried out with respect to a low-frequency component 2LL to separate sub-bands 3LL, 3HL, 3LH and 3HH indicated by a decomposition level 3. In FIG. 3, the sub-bands which are to be subjected to the encoding at each decomposition level are indicated by halftone dot meshing. For example, if there are three decomposition levels, the sub-bands 3HL, 3LH, 3HH, 2HL, 2LH, 2HH, 1HL, 1HL and 1HH indicated by the halftone dot meshing are to be subjected to the encoding, and the sub-band 3LL is not encoded.

Next, target bits which are to be subjected to the encoding are determined in the order of the specified encoding, and a context is generated from neighboring bits of the target bits in the quantization and inverse quantization section 103 shown in FIG. 1.

Figure 4:
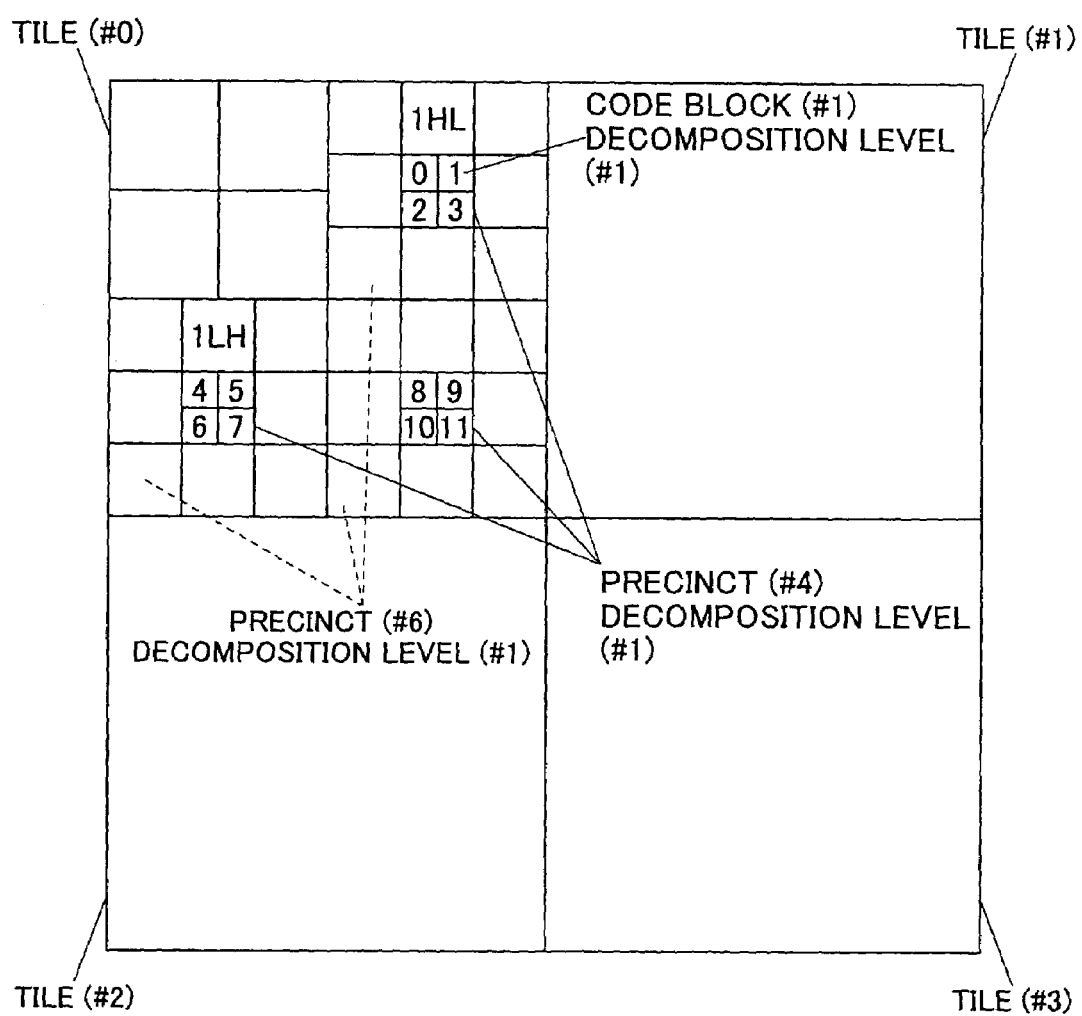
FIG. 4 is a diagram showing a precinct.

The wavelet coefficients after the quantization process ends are divided into non-overlapping rectangles called "precinct" for each of the sub-bands. The precinct is introduced to effectively utilize the memory upon implementation. FIG. 4 is a diagram showing the precinct. As shown in FIG. 4, one precinct is made up of three spatially matching rectangular regions. Furthermore, each precinct is divided into "code blocks" of non-overlapping rectangles. The code block becomes a basic unit of entropy encoding.

The coefficient values after the wavelet transform may be quantized and encoded as they are. But in the case of the JPEG2000, the coefficient values are decomposed into "bit plane" units in order to improve the encoding efficiency, and the "bit plane" may be ordered for every pixel or code block.

Figure 5:
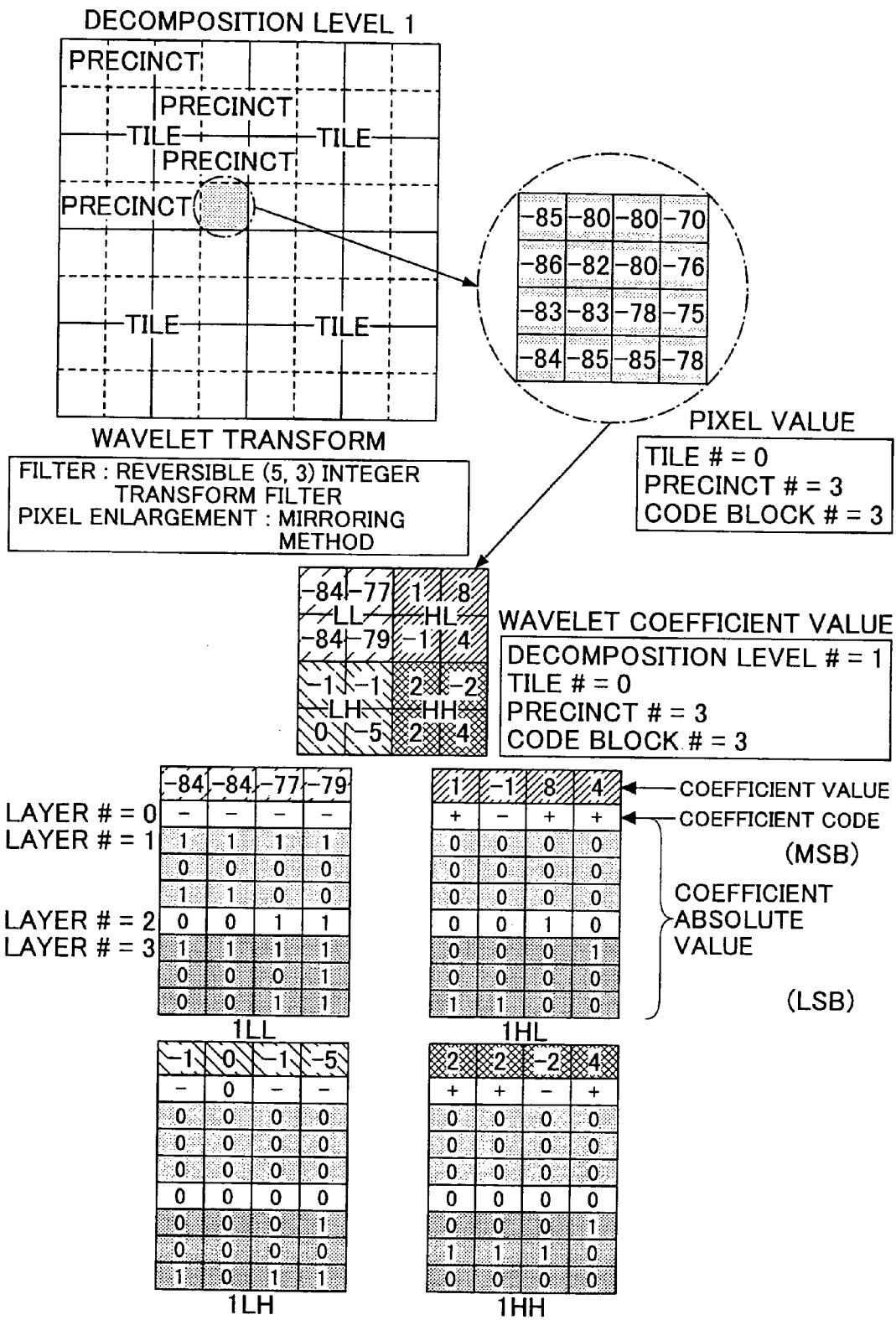
FIG. 5 is a diagram showing an ordering procedure with respect to a bit plane.

FIG. 5 is a diagram showing an ordering procedure with respect to the bit plane. FIG. 5 shows a case where the original image having 32×32 pixels is divided into four tiles each having 16×16 pixels, and the precinct and the code block of the decomposition level 1 respectively have sizes of 8×8 pixels and 4×4 pixels. The precinct and the code block are numbered in the raster sequence, and in this particular case, precinct numbers (#) 0 to 3 are allocated to the precincts, and code block numbers (#) 0 to 3 are allocated to the code blocks. A mirroring method is used for the pixel enlargement with respect to the outside of the tile boundary, and the wavelet transform is carried out by a reversible (5, 3) filter to obtain the wavelet coefficient values of the decomposition level 1.

In addition, FIG. 5 also shows the concept of a typical "layer" structure for the tile number (#) 0, the precinct number (#) 3 and the code block number (#) 3. The code block after the transform is divided into the sub-bands 1LL, 1HL, 1LH and 1HH, and the wavelet coefficient is allocated to each sub-band.

The layer structure is easier to understand when the wavelet coefficient values are viewed from the horizontal direction (bit plane direction). One layer is formed by an arbitrary number of bit planes. In this particular case, each of the layer numbers (#) 0, 1, 2 and 3 is made up of the bit plane numbers (#) 1, 3, 1 and 3. The layers including the bit plane closer to the least significant bit (LSB) are subjected to the quantization earlier, and the layers including the bit plane closer to the most significant bit (MSB) are subjected to the quantization later and remain unquantized until the end or remain unquantized to the end. The method which discards the layers closer to the LSB is called truncation, and is capable of finely controlling the quantization rate.

In the entropy encoding and decoding section 104 shown in FIG. 1, the encoding with respect to the tiles 112 of each component 111 is carried out by probability estimation based on the context and the target bit. The encoding process is carried out in units of the tiles 112 for all of the components 111 of the original image. Finally, the tag processing section 105 combines all of the encoded data from the entropy encoding and decoding section 104 into one code sequence data, and adds a tag to the code sequence data.

On the other hand, when decoding the encoded data, the image data is generated from the code sequence data of each tile 112 of each component 111, in a manner in reverse to that at the time of encoding the image data. In this case, the tag processing section 105 analyzes the tag information which is added to the code sequence data which is input from the outside, decomposes the code sequence data into the code sequence data of each tile 112 of each component 111, and carries out the decoding process (expansion process) for every code sequence data of each tile 112 of each component 111. In this state, the position of the bit to be subjected to the decoding is determined in the order based on the tag information within the coded sequence data, and the quantization and inverse quantization section 103 generates the context from the arrangement of the neighboring bits (decoding of which is already ended) to the target bit position. The entropy encoding and decoding section 104 carries out the decoding by the probability estimation based on the context and the coded sequence data to generate the target bit, and the generated target bit is written at the position of the target bit. Since the decoded data is spatially divided for every frequency band, each tile of each component of the image data can be restored by subjecting the decoded data to the two-dimensional wavelet inverse transform in the two-dimensional wavelet transform and inverse transform section 102. The restored data is transformed into the image data of the original calorimetric system by the color space transform and inverse transform section 101.

Figure 6:
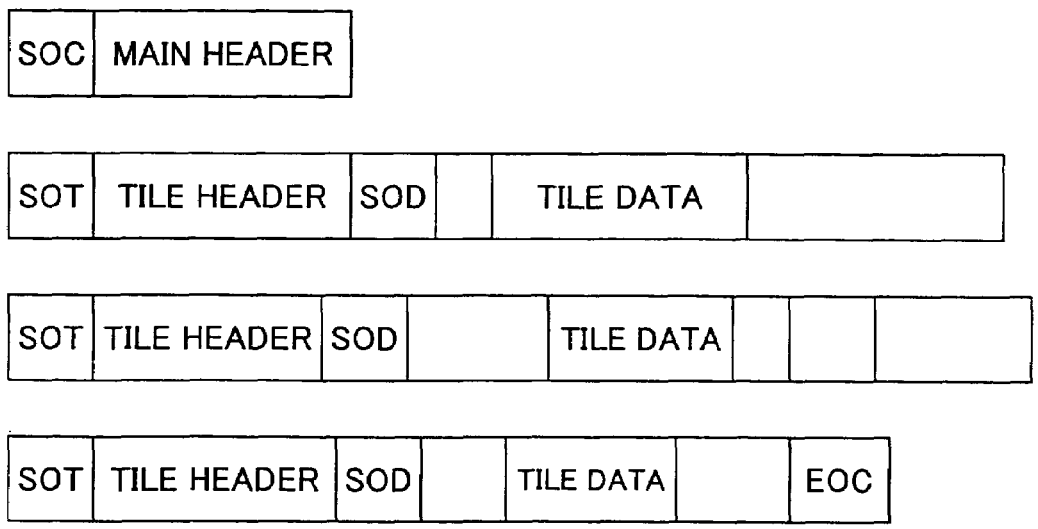
FIG. 6 is a diagram generally showing a code format of JPEG2000.

Next, a description will be given of the structures of header information and marker segments used by the code according to the JPEG2000, by referring to the code format of the JPEG2000. FIG. 6 is a diagram generally showing the code format of the JPEG2000. The code format shown in FIG. 6 starts from a Start of Codestream (SOC), followed by a main header and the actual coded data. Encoding parameters and quantization parameters are written in the SOC. The actual code data starts with a Start of Tile-part (SOT) marker, and is formed by a tile header, a Start of Data (SOD) marker and tile data (code). An End of Codestream (EOC) marker which indicates the end of the code is added after the coded data corresponding to the entire image.

Figure 7:
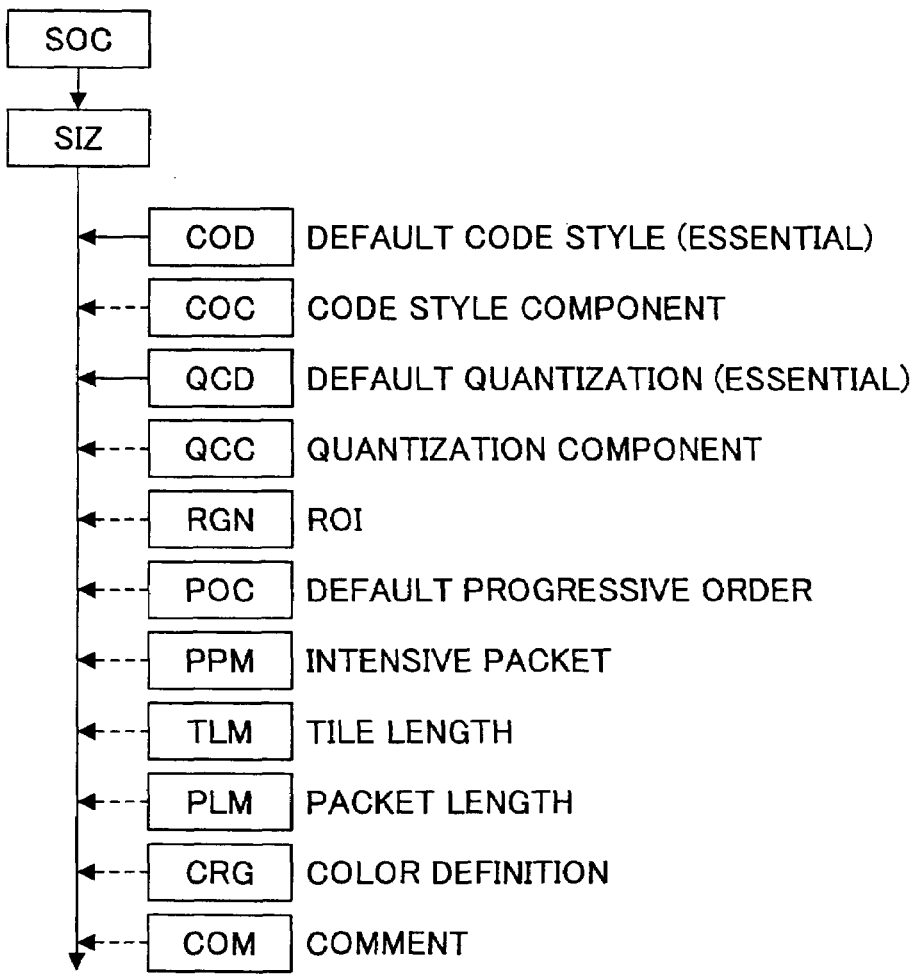
FIG. 7 is a diagram showing a main header of the coding format of the JPEG2000.

FIG. 7 is a diagram showing the main header of the coding format of the JPEG2000. As shown in FIG. 7, the main header includes essential marker segments COD and QCD, and optional marker segments COC, QCC, RGN, POC, PPM, TLM, PLM, CRG and COM.

Figure 8A:
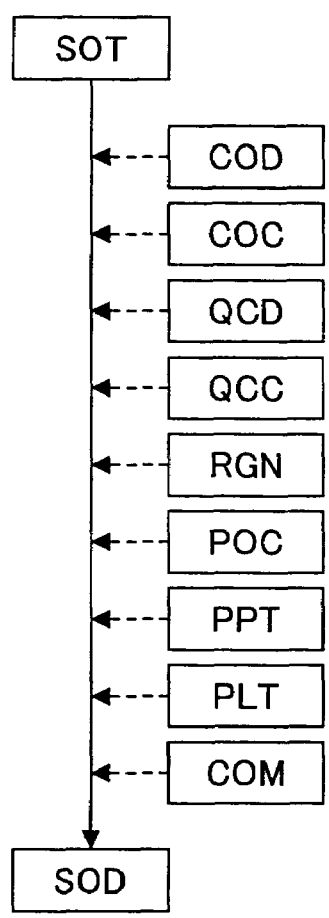
FIGS. 8A and 8B are diagrams showing a tile header of the coding format of the JPEG2000.
Figure 8B:
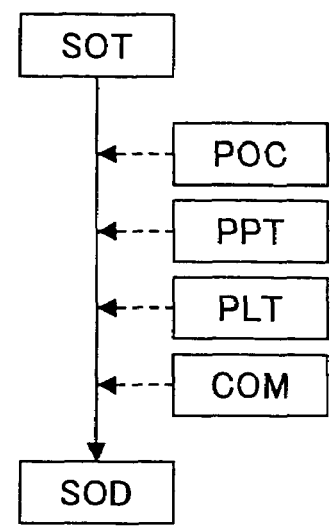

FIGS. 8A and 8B are diagrams showing the tile header of the coding format of the JPEG2000. FIG. 8A shows a marker segment sequence which is added to the head of the tile header, and marker segments (all optional) COD, COC, QCD, QCC, RGN, POC, PPT, PLT and COM may be used therefore. On the other hand, FIG. 8B shows a marker segment sequence which is added to the head of a divided tile part sequence which is obtained when the inside of the tile is divided into a plurality of tile parts, and marker segments (all optional) POC, PPT, PLT and COM may be used therefore.

A description will be given of the markers and the marker segments used by the JPEG2000. The marker is formed by two bytes, where a head byte is 0xff and the following bytes are 0x01, . . . , 0xfe. The marker and the marker segment may be categorized into the following six kinds.

(1) Frame sectioning (delimiting)
(2) Information related to position and size of image (fixed information)
(3) Information related to encoding function (functional)
(4) Withstand characteristic with respect to error (in bit stream)
(5) Pointer of bit stream (pointer)
(6) Auxiliary information (informational)

Of the kinds described above, the kinds (1) through (3) of the marker (that is, delimiting marker, fixed information marker, and functional marker) and marker segments are related to the present invention, and a description will be given thereof in the following.

First, a description will be given of the delimiting marker and marker segment. The delimiting marker and marker segment are essential, and include SOC, SOT, SOD and EOC. The SOC is added to the head of the code sequence. The SOT is added to the head of the tile code sequence. FIG. 9 is a diagram showing a structure of the SOT marker segment. The SOT marker segment includes contents Lsot, Isot, Psot, TPsot and TNsot. The size of the marker segment is written in Lsot, the tile number (a number starting from 0 and assigned in the raster sequence) is written Isot, the tile length is written in Psot, the tile part number is written in TPsot, and the number of tile parts is written in TNsot. The Isot indicated by the halftone dot meshing in FIG. 9 forms the header information part which is to be subjected to the rewriting when the tile number is to be changed.

Figure 10:
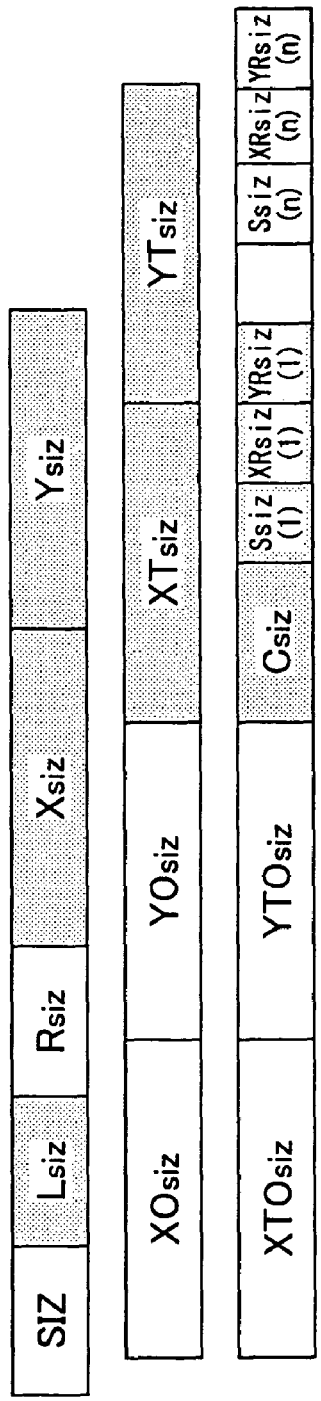
FIG. 10 is a diagram showing a structure of an SIZ marker segment.

Next, a description will be given of the fixed information marker segment. The information related to the image is written in the fixed information marker, and an SIZ marker is used as the fixed information marker. An SIZ marker segment is added immediately after the SOC marker. The marker segment length depends on the number of components. FIG. 10 is a diagram showing a structure of the SIZ marker segment. The SIZ marker segment includes contents Lsiz, Rsiz, Xsiz, Ysiz, XOsiz, YOsiz, XTsiz, YTsiz, XTOsiz, YTOsiz, Csiz, Ssiz(i), XRsiz(i) and YRsiz(i). The size of the marker segment is written in Lsiz, the code sequence compatibility (0: fixed, other than 0: reserved) is written in Rsiz, the horizontal direction size on a reference grid is written in Xsiz, the vertical direction size on the reference grid is written in Ysiz, the offset position in the horizontal direction of the image from an origin on the reference grid is written in XOsiz, the offset position in the vertical direction of the image from the origin on the reference grid is written in YOsiz, the horizontal direction size of the tile is written in XTsiz, the vertical direction size of the tile is written in YTsiz, the horizontal direction offset position of the tile from the origin on the reference grid is written in XTOsiz, the vertical direction offset position of the tile from the origin on the reference grid is written in YTOsiz, the number of components is written in Csiz, the sign and the number of bits at the ith component is written in Ssiz(i), the sampling distance in the horizontal direction at the ith component is written in XRsiz(i), and the sampling distance in the vertical direction at the ith component is written in YRsiz(i).

The Xsiz, Ysiz, XTsiz and YTsiz which are related to the image size and the tile size and indicated by the halftone dot meshing in FIG. 10 form the header information part which is to be written when the resolution level is to be changed. In addition, the Csiz, Ssiz, XRsiz and YRsiz form the header information part which is to be written when the number of components is to be reduced. In addition, the XRsiz and YRsiz form the header information part which is to be written when the number of tiles is to be reduced.

Next a description will be given of the functional marker segment. The functional marker segment indicates the functions of the code which is obtained by the encoding. In a case where the tile is divided into a plurality of tile parts, the functional marker segment is added to the head tile part (Tsot=0). COD, COC, QCD, QCC and the like may be used for the functional marker segment.

Figure 11:
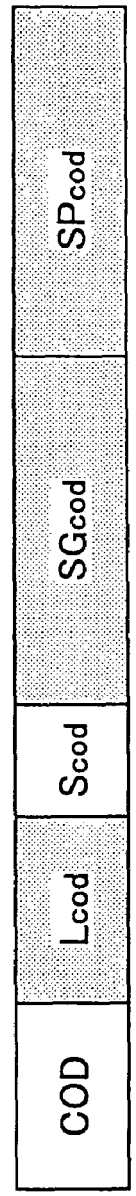
FIG. 11 is a diagram showing a structure of a COD marker segment.

The COD is essential, and a default coding style is written in the COD. The marker length depends on the length of Scod. FIG. 11 is a diagram showing a structure of the COD marker segment. The COD marker segment includes contents Lcod, Scod, SGcod and SPcod. The size of the marker segment is written in Lcod, the coding style with respect to all of the components is written in Scod, the parameters of the coding style which does not depend on the component is written in SGcod, and the parameters of the coding style related to the component is written in SPcod.

The Lcod and SPcod indicated by the halftone dot meshing in FIG. 11 form the header information part which is to be written when the resolution level is to be changed. In addition, the SGcod forms the header information part which is to be rewritten when the number of components is to be reduced or the number of layers is to be reduced.

The contents of the SGcod (32 bits) include a part where the "progressive order" is written in 8 bits, a part where the "number of layers" is written in 16 bits, and a part where information related to the "color transformation" is written in 8 bits. The progressive order will be described later in more detail. But for example, the progressive order is set to a value "0000 0000" in a case where "layer">>"resolution">>"component">>"position", and is set to a value "0000 0001" in a case where "resolution">>"layer">>"component">>"position". The progressive order is set to a value "0000 0010" in a case where "resolution">>"position">>"component">>"layer", and is set to a value "0000 0011" in a case where "position">>"component">>"resolution">>"layer". The progressive order is set to a value ""0000 0100" in a case where "component">>"position">>"resolution">>"layer". In addition, the color transformation is set to a value "0000 0000" in a case where the color transformation is undefined. The color transformation is set to a value "0000 0001" in ICT (irreversible transform) when a 9-7 filter is used, and in RCT (reversible transform) when a 5-3 filter is used. The part of the SGcod related to the number of layers forms the header information part which is to be rewritten when the number of layers is to be reduced. On the other hand, the color transformation part of the SGcod forms the header information part which is to be rewritten when the number of components is to be reduced.

The contents of the SPcod include a part where the number of decompositions (decomposition levels) is written, a part where the size of the code block is written, a part where the wavelet transform (9-7 irreversible transform or 5-3 reversible transform) is written, a part where the precinct size is written, and the like. The part related to the precinct size is written with the horizontal direction size (an index number PPx of exponent of 2) and the vertical direction size (an index number PPy of exponent of 2). The parts of the SPcod related to the number of decompositions and the precinct size form the header information part which is to be rewritten when the resolution level is to be changed.

Exception of the coding style is written in the component coding style marker COC, and this component coding style marker COC is added when the encoding different from the COD is to be made. In the case where the tile is divided into a plurality of tile parts, the marker length added to the head tile depends on the length of the Scoc. The priority order of the COD and the COD is "COC added to tile part">"COD added to tile part">"COC of main header">"COD of main header".

Figure 12:
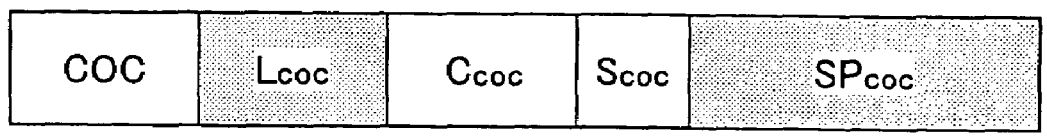
FIG. 12 is a diagram showing-a structure of a COC marker segment.

FIG. 12 is a diagram showing a structure of the COC marker segment. The COC marker segment includes Lcoc, Ccoc, Scoc and SPcoc. The size of the marker segment is written in the Lcoc, and the component number (8 bits or 16 bits depending on the value of Csiz) is written in the Ccoc. The coding style with respect to the instant component is written in the Scoc, and the parameters of the coding style are written in the SPcoc. The Lcoc and SPcoc indicated by the halftone dot meshing in FIG. 12 form the header information part which is to be rewritten when the resolution level is to be changed.

The default quantization marker QCD is written with the default quantization style. The default quantization marker QCD is added to the head tile in a case where the tile is divided into a plurality of tile parts. The marker length depends on the number of quantization values.

Figure 13:
FIG. 13 is a diagram showing a structure of a QCD marker segment.

FIG. 13 is a diagram showing a structure of the QCD marker segment. The QCD marker segment includes Lqcd, Sqcd and SPqcd. The size of the marker segment is written in the Lqcd. The quantization style with respect to all of the components is written in the Sqcd. The total number of bit planes to be encoded (total number of bit planes of the wavelet coefficients) is written in the SPqcd as the quantization step size. The Lqcd and SPqcd indicated by the halftone dot meshing in FIG. 13 form the header information part which is to be rewritten when the resolution level is to be changed.

The component quantization marker QCC is added when a quantization different from that of the QCD is to be made. The component quantization marker QCC is added to the head tile in a case where the tile is divided into a plurality of tile parts. The marker length depends on the number of quantization values. The priority order of the QCD and the QCC is "QCC added to tile part">"QCD added to tile part".

Figure 14:
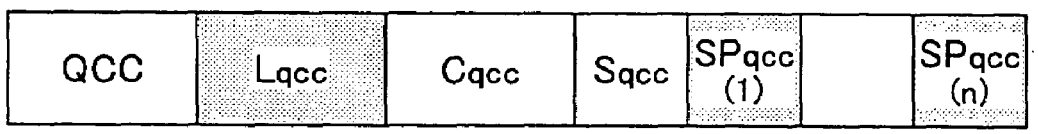
FIG. 14 is a diagram showing a structure of a QCC marker segment.

FIG. 14 is a diagram showing a structure of the QCC marker segment. The QCC marker segment includes Lqcc, Cqcc, Sqcc and SPqcc. The size of the marker segment is written in the Lqcc, and the component number (8 bits or 16 bits depending on the value of Csiz) is written in the Cqcc. The coding style with respect to the instant component is written in the Sqcc, and the total number of bit planes to be encoded (dynamic range of wavelet coefficients) is written in the SPqcc as the quantization step size. The Lqcc and SPqcc indicated by the halftone dot meshing in FIG. 14 form the header information part which is to be rewritten when the resolution level is to be changed.

Next, a description will be given of the reason why it is possible to decode (that is, partially decode) the codes which are less than the maintained codes, by only rewriting the header information within the codes in the state where the code information other than the header information is maintained in the original state.

Figure 15:
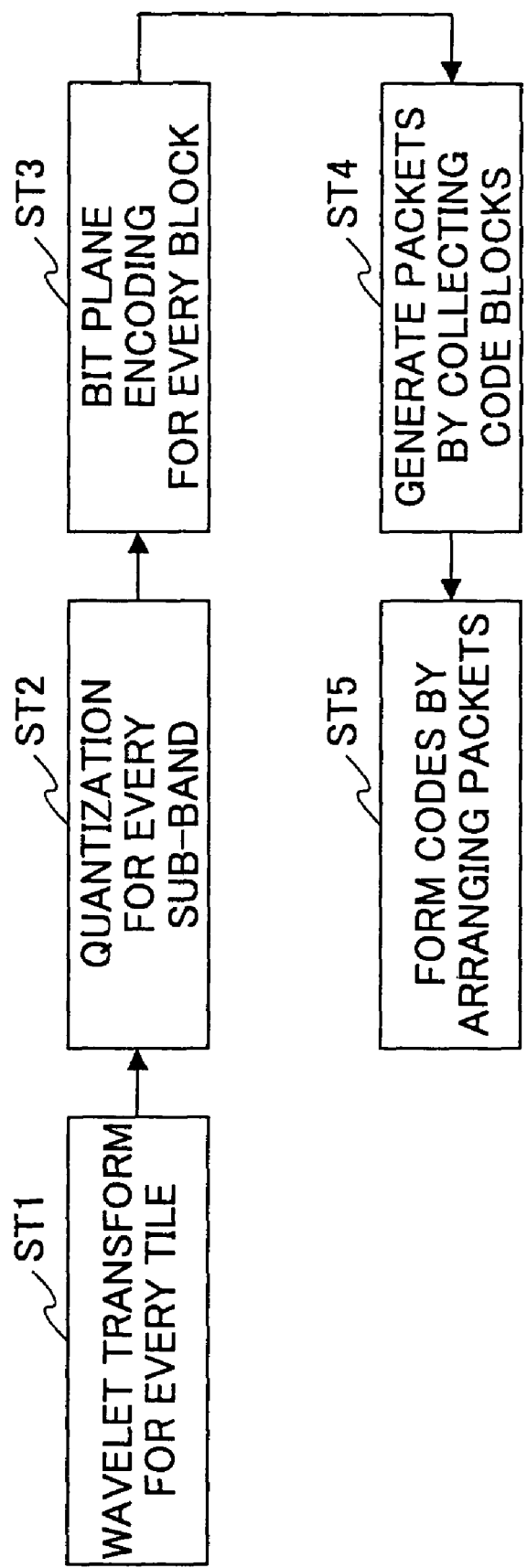
FIG. 15 is a diagram generally showing a process flow of an encoding process of the JPEG2000.

The encoding process of the JPEG2000 was described above with reference to FIG. 1. The process flow of the encoding process can generally be rewritten in a manner shown in FIG. 15. FIG. 15 is a diagram generally showing the process flow of the encoding process of the JPEG2000. A step ST1 carries out the wavelet transform for every tile, and a step ST2 carries out the quantization for every sub-band. A step ST3 carries out the bit plane encoding for every code block. Thereafter, a step ST4 generates packets by collecting the codes of the code blocks, and a step ST5 arranges the packets to form the codes. In the last two blocks, the code forming process arranges the code units, called "packets", in a desired order.

Figure 16:
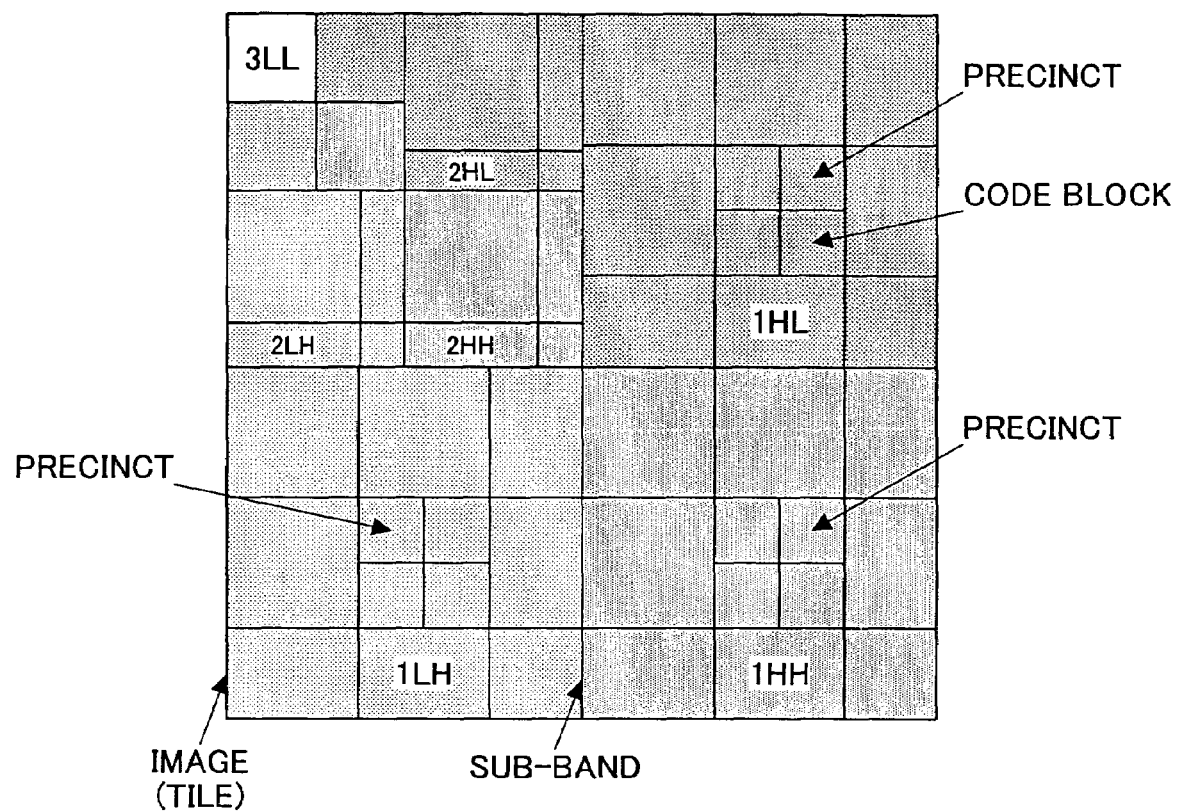
FIG. 16 is a diagram for explaining a relationship of an image, tile, sub-band, precinct and code block.

Although the JPEG2000 was generally described above, a description will be given of the relationship of the "image", "tile", "sub-band", "precinct" and "code block", and the relationship of the "packet" and "layer", by referring to FIG. 16. FIG. 16 is a diagram for explaining the relationships of the image, the tile, the sub-band, the precinct and the code block.

First, the physical sizes of the image, the tile, the sub-band, the precinct and the code block have a relationship "image"≧"tile">"sub-band"≧"precinct"≧"code block".

The tile is obtained when the image is divided into rectangular regions, and the image is equal to the tile if the number of divisions (rectangular regions) is one. The precinct is obtained by dividing the sub-band into rectangles, and roughly indicates the position within the image. Three precincts obtained by dividing the three sub-bands HL, LH and HH form a group. However, the precinct obtained by dividing the sub-band LL forms a group by itself. The precinct and the sub-band may have the same size. The code block is obtained by further dividing the precinct into rectangles.

The packet is a collection of a portion of the codes obtained from all of the code blocks included in the precinct. For example, the packet is a collection of the codes from the MSB to the third bit plane of all of the code blocks. The "portion" of the codes includes "vacant", and thus, the contents of the packet may be a "vacant" code. When the packets of all of the precincts (=all code blocks=all sub-bands) are collected, a part of the codes of the entire image region, that is, the layer, is formed. For example, the part of the codes of the entire image region may be the codes from the MSB to the third bit plane of the wavelet coefficients for the entire image region. Since the layer is roughly a part of the codes of the bit planes of the entire image region, the picture quality is improved as the number of layers which are decoded increases. In other words, the layer may be regarded as a unit of indicating the picture quality.

Therefore, when all of the layers are collected, the codes of all of the bit planes of the entire image region are obtained.

FIGS. 17A and 17B are diagrams for explaining a relationship of the layer and the packet. FIGS. 17A and 17B show the relationship of the layer and the packets included in the layer, for a case where the number of hierarchical layers (decomposition levels) of the wavelet transform is 2, and the precinct size is equal to the sub-band size. Since the packet is in units of precincts, the packet spans the sub-bands HL to HH when the precinct is equal to the sub-band. FIG. 17B shows some of the packets surrounded by a bold line.

Such an arrangement of the packets shown in FIG. 17B is called the "progressive order", which will be described hereunder. According to the code sequence control of the JPEG2000, the final code sequence suited for the purpose is generated based oh the code sequence which is subjected to the entropy encoding. The purpose in this-case includes the picture quality, the resolution, the progressive order related to the picture quality and the resolution, the code size, and the like. For example, with respect to the picture quality, the picture quality level may be set in several stages, and the end point with respect to the code sequence of every block may be determined so as to form an optimum code with respect to the set picture quality level. Various methods may be employed to determine the code end point. For example, it is possible to determine the code end point using an amount of code increase (ΔR) and a picture quality improvement (ΔD) which are calculated at the time of the entropy encoding.

Figure 18A:
FIGS. 18A and 18B are diagrams for explaining code sequences for improving the resolution and picture quality in relation to a progressive order.
Figure 18B:

The progressive order may roughly be categorized into a first system which improves the spatial resolution and a second system which improves a signal-to-noise ratio (SNR) picture quality. FIGS. 18A and 18B are diagrams for explaining code sequences for improving the resolution and picture quality in relation to the progressive order. The first system successively forms the codes from the low-frequency sub-bands as shown in FIG. 18A, and the resolution gradually becomes high. On the other hand, the second system utilizes the bit plane encoding, and as shown in FIG. 18B, the codes are successively formed from the higher bit planes, and the resolution is constant while the picture quality gradually improves. The JPEG has the progressive function for the resolution and the coefficients as an extended function, but since a process such as resolution conversion is required in order to progressively improve the spatial resolution, the DCT becomes necessary each time. Accordingly, the progressive order described above is a characterizing feature of the JPEG2000. Another characterizing feature of the JPEG2000 is that a mutual conversion is possible between the progressive order of the first system and the progressive order of the second system by rearranging the codes.

Five methods LRCP, RLCP, RPCL, PCRL and CPRL are defined with respect to the progressive order, depending on combinations of the resolution (or resolution level), precinct (or position), color component (or component) and layer.

Figure 19:
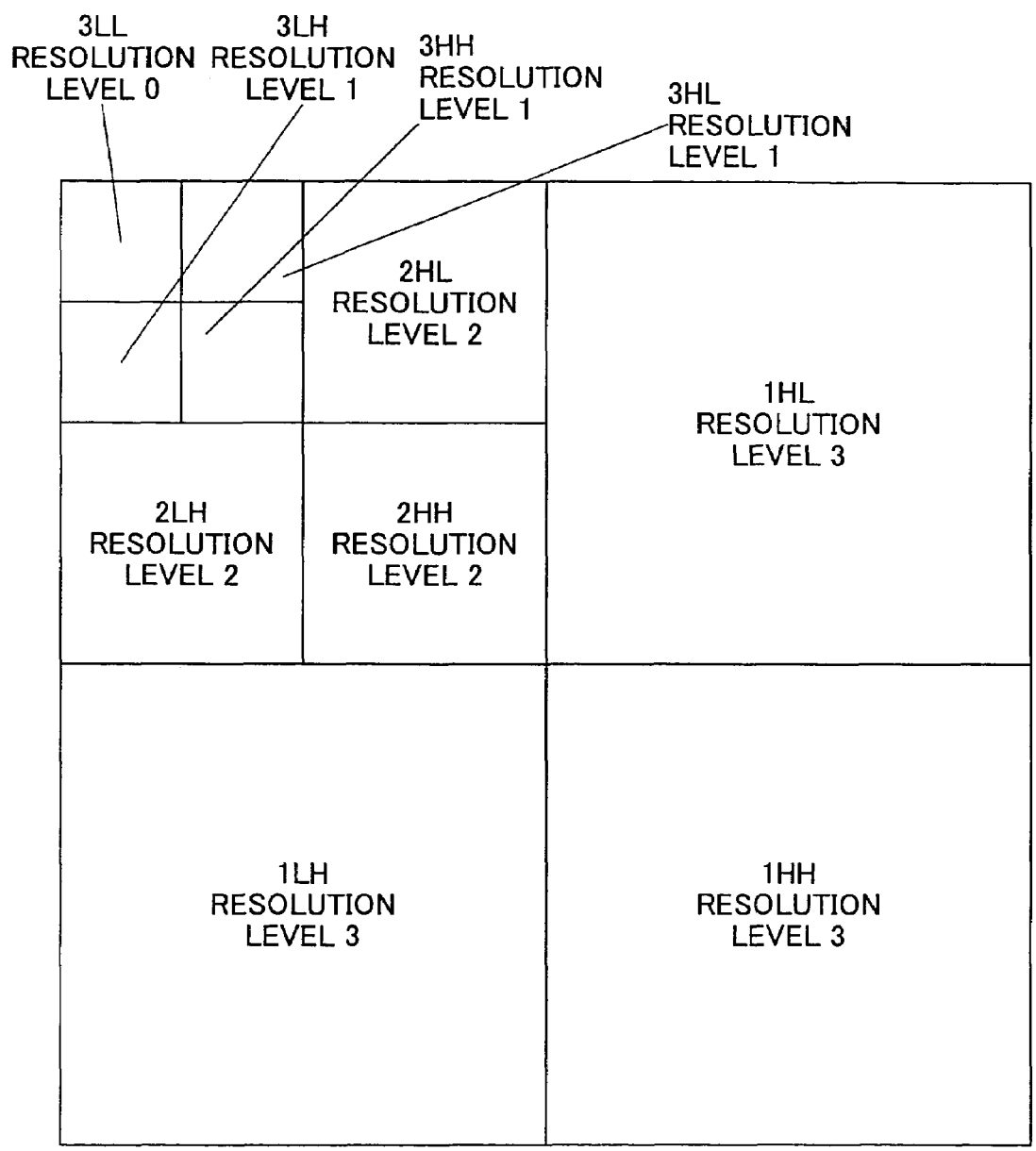
FIG. 19 is a diagram for explaining a relationship between a decomposition level and a resolution level.

LRCP=Layer-Resolution Level-Component-Position
RLCP=Resolution Level-Layer-Component-Position
RPCL=Resolution Level-Position-Component-Layer
PCRL=Position-Component-Resolution Level-Layer
CPRL=Component-Position-Resolution Level-Layer FIG. 19 is a diagram for explaining a relationship between the decomposition level and the resolution level. The relationship between the decomposition level (number of wavelet transforms to be carried out) and the resolution level, that is, the definitions of the terms, are as shown in FIG. 19. FIG. 19 shows a case where there are three decomposition levels.

A description will be given of the arrangement of the packets in the progressive order by the encoder, and the decoding of the packets in the progressive order by the decoder.

In a case where the progressive order is the LRCP order, the arrangement of the packets (at the time of encoding) and the analyzing of the packets (at the time of decoding) are carried out in the following order according to the JPEG2000 standard specifications.

```
for (layer) {
    for (resolution) {
        for (component) {
            for (precinct) {
                At time of encoding: arrange packets
                At time of decoding: analyze packets
            }
        }
    }
}
```

The packet itself has the packet header, but the layer number, resolution number and the like are not written in the header. When judging the layer and the resolution of the packet at the time of the decoding, the above described "for" loop is formed from the progressive order specified by the COD tag within the main or tile-part header information, so as to determine the "for" loop in which the packet is handled.

The number of layers, the number of resolutions, the number of components and the number of precincts can be read from the tag within the main or tile-part header information, as described above. The number of precincts can be calculated because the precinct size can be obtained from the tag. Hence, the number of packets can be counted as long as the boundary of the packets can be judged.

A description will be given of a packet header (header at the head of the packet). The length of the code included in the packet is written in the packet header. Hence, the boundary of the packets can be counted.

The packet is a minimum unit of code sequence (in units of bytes) which becomes the basis, and indicates the code sequence of a specific tile, layer, color component, reduction level and precinct. The code sequence with respect to the LL component becomes a target at the minimum resolution, and the code sequence with respect to each of the sub-bands HL, LH and HH becomes the target at other resolutions. The packet is formed by the packet header and the packet data (packet body). The packet header includes information related to the packet having a length 0, the existence of a code block, the number of 0 bit planes, the number of code paths, and the length of the coded data.

Figure 20:
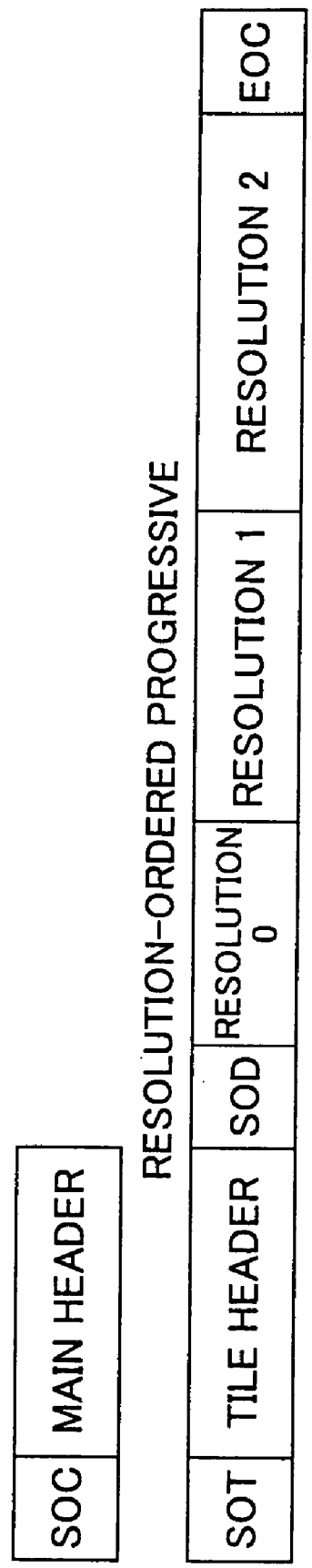
FIG. 20 is a diagram for explaining an RLCP order format.

Under these preconditions, the code of a single layer will be considered for a case where the progressive order is the RLCP order (resolution-ordered progressive) as shown in FIG. 20. FIG. 20 is a diagram for explaining the RLCP order format.

In the case of such a code, the decoder reads the progressive order from the header information, and analyzes the packet according to the following loop.

```
for (resolution) {
    for (layer) {
        for (component) {
            for (precinct) {
                Analyze packet
            }
        }
    }
}
```

For example, when the value of the tag decomposition level (resolution level) within the header information is rewritten to make it appear as if there is only one resolution level, the value of the resolution in the first "for" loop is set to one within the decoder, and only the packets having the resolution level of up to one is handled. Consequently, it is possible to carry out a partial decoding from the point of view of the resolution.

Similarly, in the case of the LRCP order or the like, the "for" loop is carried out according to the progressive order so that only the packets of up to a predetermined layer are handled. As a result, it is possible to carry out a partial decoding from the point of view of the picture quality. Similarly, the "for" loop may be carried out according to the progressive order so that only the packets of up to a predetermined number of components are handled.

In order to ensure correct partial decoding, the header information which is forcibly rewritten needs to be the number of elements substantially at the highest level (outermost "for" loop in the case described above) of the progressive order and the header information related to the elements. In other words, it is possible to prevent correct decoding if the number of elements not substantially at the highest level of the progressive order or the header information related to the elements are rewritten or, the marker itself indicating the progressive order is rewritten.

Figure 21:
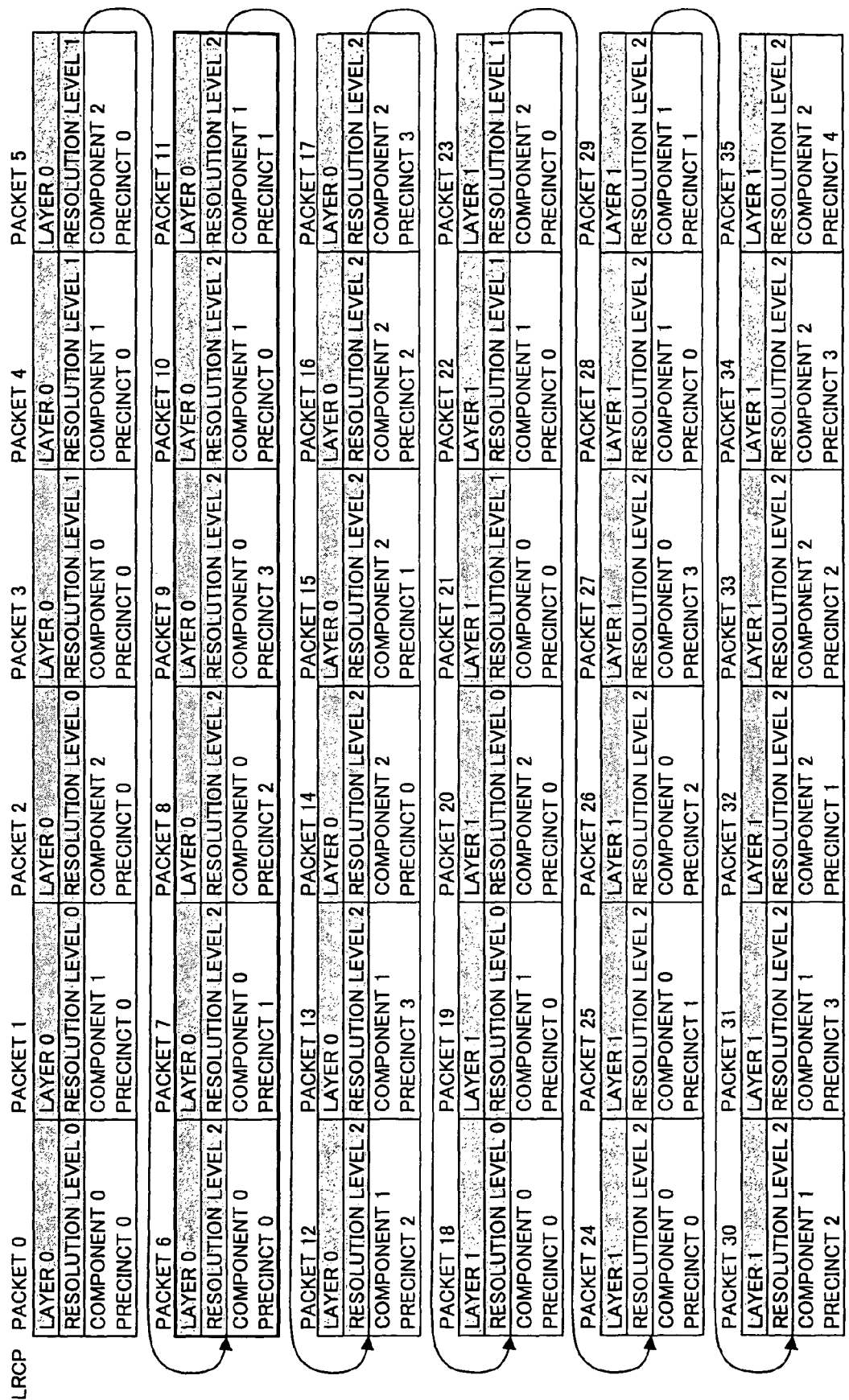
FIG. 21 is a diagram for explaining the permutation of packets corresponding to the analyzing order of the packets.
Figure 22:
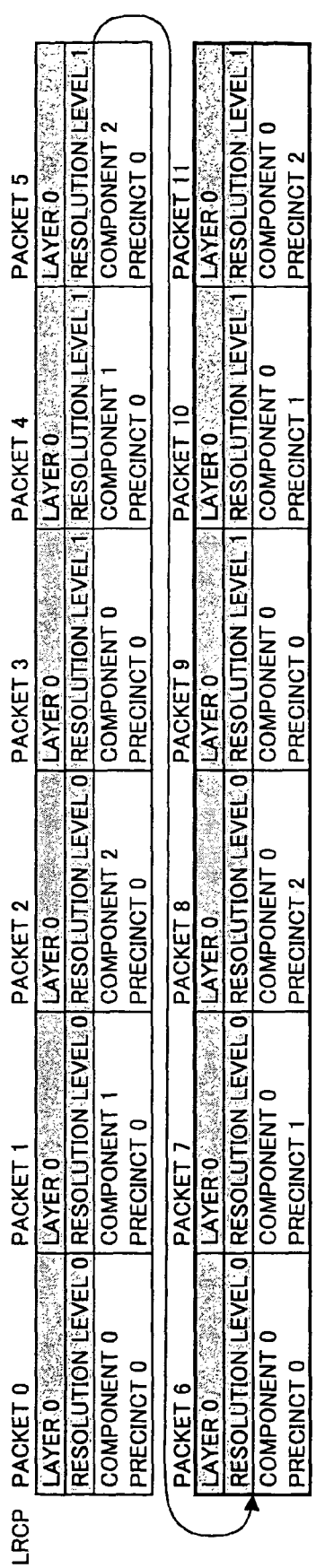
FIG. 22 is a diagram for explaining the permutation of packets corresponding to the analyzing order of the packets in a case where the rewriting of header information does not depend on elements in a highest level of a progressive order.
Figure 23:
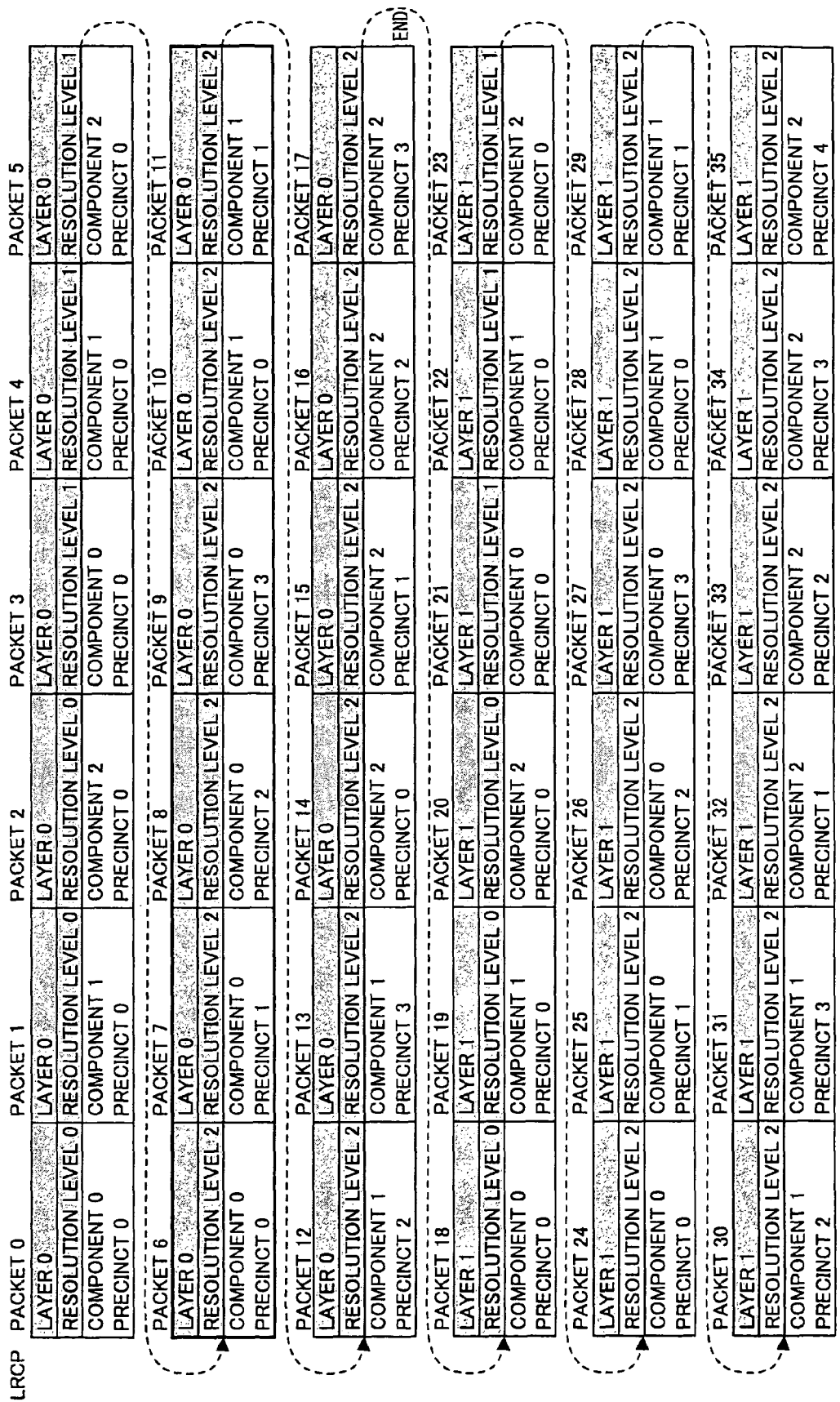
FIG. 23 is a diagram explaining the permutation of packets corresponding to the analyzing order of the packets in a case where the rewriting of header information depends on the elements in the highest level of the progressive order.

Next, a more detailed description of the above will be given with reference to FIGS. 21 through 23. FIG. 21 is a diagram for explaining the permutation of packets corresponding to the analyzing order of the packets. FIG. 21 shows the permutation of 36 packets (the analyzing order of the packets) for a case where the image size is 100×100 pixels, there are two layers, the number of resolution levels is 3 (0 to 2), there are three components, the precinct size is 32×32 pixels, and the progressive order employed is the LRCP order.

In this state, suppose that the number of resolution levels within the code tag is rewritten to 2 (0 to 1), for example. In this case, as may be readily understood from the "for" loop described above, the packets 6 through 11 which should originally have the resolution level 2 are analyzed as the resolution levels 0 to 1 of the layer 0, as shown in FIG. 22. FIG. 22 is a diagram for explaining the permutation of packets corresponding to the analyzing order of the packets in the case where the rewriting of header information does not depend on elements in the highest level of the progressive order.

Therefore, in order to correctly carry out the partial decoding, the header information which is rewritten needs to be the number of elements substantially at the highest level (outermost "for" loop in the case described above) of the progressive order, and the header information related to the elements. The target is the layer in the case shown in FIG. 21, and when the number of layers within the code tag is rewritten to 1, for example, the order of the packets become as shown in FIG. 23. FIG. 23 is a diagram explaining the permutation of packets corresponding to the analyzing order of the packets in a case where the rewriting of header information depends on the elements in the highest level of the progressive order. In FIG. 23, the decoding ends at a part indicated by "END", and the decoding of portions indicated by the dotted lines is skipped, so that the packets are analyzed correctly.

As described above, the image is divided into the "tiles", but in addition to the progressive order described above, a loop related to the tile also exists. Although not in the JPEG2000 standard specifications (and at the discretion of the user), the decoder normally takes the following structure.

```
while (as long as tile exists)
    for (resolution) {
        for (layer) {
            for (component) {
                for (precinct) {
                    analyze packet
                }
            }
        }
    }
```

And as described above, the tile number is written in the SOT tag of the header, and the tile size and the image size are written in the SIZ tag. Accordingly, when the image size of the header information is rewritten to ½, the decoder normally judges that a number of tiles within the range of the image size of ½ exist and attempts to decode only the codes of the tiles having the tile numbers within the above number, although dependent on the structure of the decoder. As a result, the partial decoding is also possible in this case.

An embodiment of the code conversion apparatus, the code conversion method and the computer-readable storage medium according to the present invention utilizes the decoding characteristic which accompany the wavelet inverse transform of the JPEG2000. With respect to the target code, only the header information is rewritten, and the editing is made in the coded state, to thereby enable the partial decoding.

Figure 24:
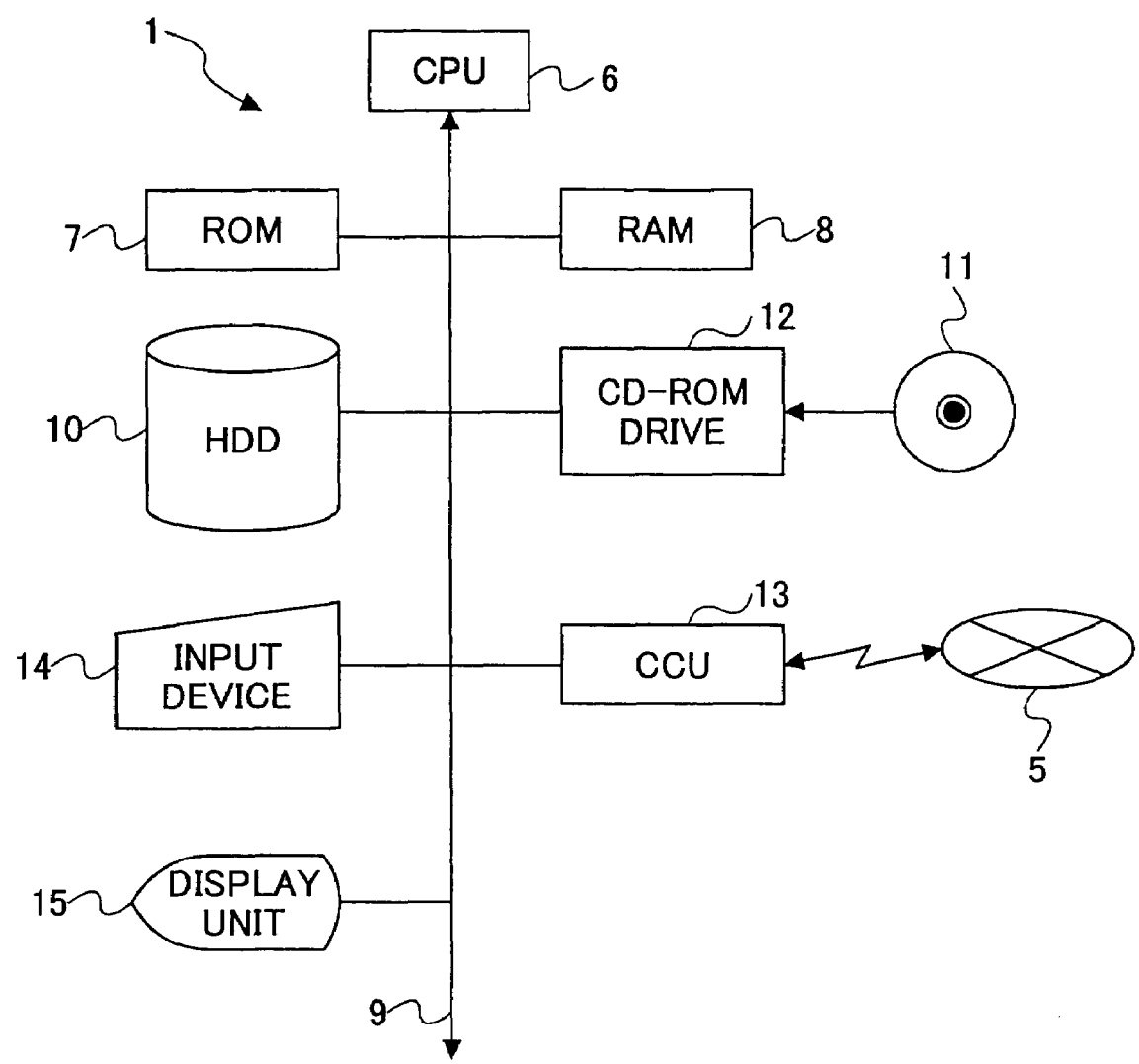
FIG. 24 is a system block diagram showing a hardware structure of a computer for realizing an embodiment of a code conversion apparatus according to the present invention.

This embodiment of the code conversion apparatus may be realized by a computer 1 shown in FIG. 24. FIG. 24 is a system block diagram showing the hardware structure of the computer 1 for realizing this embodiment of the code conversion apparatus according to the present invention. As shown in FIG. 24, the computer 1 includes a central process unit (CPU) 6, a read only memory (ROM) 7, a random access memory (RAM) 8, a hard disk drive (HDD) 10, a CD-ROM drive 12, a communication control unit (CCU) 13, an input device 14, and a display unit 15 which are connected via a bus 9.

The CPU 6 processes information by executing programs or the like. The ROM 7 and the RAM 8 form a primary storage for storing information. The HDD 10 stores external compressed codes downloaded via the Internet, a network 5 or the like. The CD-ROM drive 12 stores information, including external information, in a CD-ROM 11, and the information stored in the CD-ROM 11 may be sent or distributed to the outside of the computer 1. The CCU 13 exchanges information with another computer or the like by communication via the network 5. The input device 14 includes a keyboard, a mouse or the like used by the user (operator) to input various commands and information to the computer 1. The display unit 15 includes a cathode ray tube (CRT), a liquid crystal display (LCD) or the like for displaying progress, results and the like of processes to the user (operator). A bus controller (not shown) may be provided for controlling arbitration of the bus 9.

Because the RAM 8 can rewritably store various data, the RAM 8 also functions as a work area for the CPU 6.

When the user turns ON the power of the computer 1, the CPU 6 starts a loader program within the ROM 7, reads an operating system (OS), which manages the hardware and software of the computer 1, from the HDD 10 into the RAM 8, and starts the operating system. The operating system starts a program, reads information, and stores information, in response to an operation carried out by the user. Typical operating systems are the WINDOWS (registered trademark) operating system and the UNIX (registered trademark) operating system. The operation programs which run on the operating system are called application programs.

A code conversion program is stored as an application program in the HDD 10 of the computer 1. Hence, the HDD 10 forms this embodiment of the computer-readable storage medium which stores the code conversion program for causing the computer 1 to carry out the code conversion process.

Generally, the operation program is stored in optical information recording media such as the CD-ROM 11 and DVD-ROM or, magnetic recording media such as floppy disk (FD). The operation program stored in such media is installed in the HDD 10 of the computer 1. Accordingly, the optical information recording media such as the CD-ROM 11 and the magnetic recording media such as the FD, which may be portable, may also form the computer-readable storage medium which stores an image processing program, including the code conversion program. The image processing program may be obtained from another computer via the network 5 and the CCU 13, and installed in the HDD 10.

Figure 25:
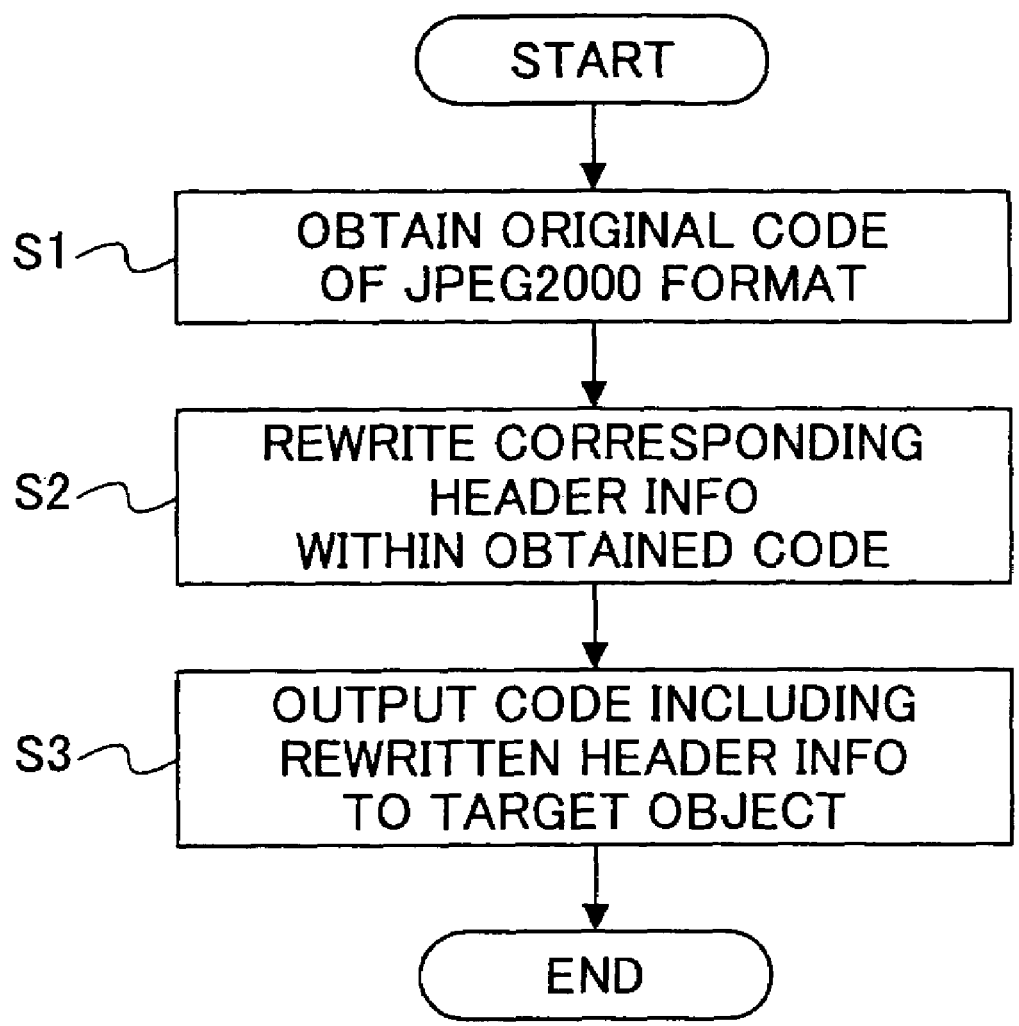
FIG. 25 is a flow chart for generally explaining a code conversion process.

FIG. 25 is a flow chart for generally explaining the code conversion process carried out by the computer 1 in this embodiment. In FIG. 25, a step S1 obtains the processing target, that is, the code which has been compressed and transformed according to the JPEG2000 algorithm, for example, and stores the code in the HDD 10. The processing target, that is, the code may be obtained from outside the computer 1, for example. A step S2 rewrites only the header information within the code stored in the HDD 10, so as to change the decoded state of the code. Hence, the code information other than the header information is maintained unchanged. A step S3 outputs the code, having the rewritten header information, to a target object which is appropriately selected depending on the purpose or use. For example, the code having the rewritten header information is output to be saved in the HDD 10, displayed on the display unit 15, or output to an external equipment via the network 5 such as the Internet. As a result, the functions of the code conversion apparatus are realized by the computer 1.

The step S1 forms an input means (or input section), an input step and an input procedure. The step S2 forms a header information rewriting means (or header information rewriting section), a header information rewriting step and a header information rewriting procedure. The step S3 forms an output means (or output section), an output step and an output procedure. Of course, the code conversion apparatus is not limited to the computer 1 and may be formed by an independent code converter.

The step S2 carries out a process depending on the purpose or the like of the code conversion. Hence, the step S2 may rewrite only the header information within the code so as to partially decode the code. In this case, the header information which is rewritten is the number of elements in the highest level of the progressive order and the header information related to the elements, as described above. Further, as in the case of the tile described above, it is possible to rewrite the header information related to the image size which is independent of the progressive order.

Moreover, the rewriting of the header information is not limited towards deteriorating the resolution level from that of the original image as in the case of the partial decoding, and for example, the header information may be rewritten towards improving the resolution level from that of the original image.

Next, a description will be given of particular examples of the code conversion process.

EXAMPLE 1

In this particular example, the progressive order of the code is the LRCP order, and the number of layers is to be reduced by n. FIG. 26 is a diagram for explaining a binary representation of an original code of Example 1, and FIG. 27 is a diagram for explaining the original code added with a tag representation. The input original code is an annotated code having an image size of 16×16 pixels, 4 layers, a resolution level 3, 3 components, and a precinct size equal to a sub-band size (that is, so-called maximum precinct), with LRCP progressive (pg of SGcod is pg=00). FIG. 26 shows the binary representation for the lossless code, and FIG. 27 shows the markers in brackets "[ ]" to show the marker arrangement.

When generating a code having the number of layers reduced to 2 (n=2) for this original code, the step S2 shown in FIG. 25 simply needs to rewrite the number of layers in the marker segment SGcod within the header information, from "0004" to "0002", as surrounded by a rectangle in FIG. 28. FIG. 28 is a diagram for explaining the code after rewriting the header information. As a general rule, when reducing the number of layers by n, the header information simply needs to be rewritten so that the number of layers in the marker segment SGcod is reduced by n.

Accordingly, the code having the number of layers in the marker segment SGcod within the header information rewritten, is output to the target object. By subjecting the code after the rewriting of the header information to a decoding process including the wavelet inverse transform of the JPEG2000, the number of layers that are decoded become partial even though the code itself other than the header information remains in the original state, and an image having a deteriorated picture quality is reproduced.

FIGS. 29A and 29B are diagrams for explaining images before and after the number of layers is changed. FIG. 29A shows the original image having 4 layers. On the other hand, FIG. 29B shows the image having 2 layers, which is obtained by decoding the code having the header information related to the number of layers rewritten.

EXAMPLE 2

In this particular example, the progressive order of the code is the RLCP order or the RPCL order, and the resolution level is to be reduced to ½". FIG. 30 is a diagram for explaining an original code of Example 2 added with a tag representation. The input original code is an annotated code having an image size of 16×16 pixels, 4 layers, a resolution level 3, 3 components, and a precinct size equal to a sub-band size (that is, so-called maximum precinct), with RLCP progressive (pg of SGcod is pg=01).

When generating a code having the resolution level reduced to $\frac{1}{2}^n$ times, that is, reduced to $\frac{1}{2}$ in a case where n=1, for example, for this original code, the step S2 shown in FIG. 25 simply needs to rewrite the header information by dividing the Xsiz, Ysiz, XTsiz and YTsiz of the SIZ tag related to the image size and the tile size within the header information by $2^n=2$ (that is, multiplied by $\frac{1}{2}^n=\frac{1}{2}$ times), so that each of the Xsiz, Ysiz, XTsiz and YTsiz is rewritten from "0000 0010" to "0000 0008" as surrounded by a rectangle in FIG. 31. FIG. 31 is a diagram for explaining the code after rewriting the header information. In addition, n=1 is subtracted from the number of decomposition levels of the SPcod of the COD tag so that the number of decomposition levels is rewritten from "03" to "02", 3n=3 is subtracted from the Lqcd of the QCD tag so that the Lqcd is rewritten from "000D" to "000A", and the last 3 entries "HL 58", "LH 58" and "HH 60" of the SPqcd of the QCD tag are deleted. The value SPqcd is related to the total number of bit planes to the encoded, that is, the number of bit planes of the wavelet coefficients. In the case of a user-defined precinct, the header information may be rewritten so that the Lcod is reduced by n, and the last n entries (not 3n entries) of the precinct size following the wt of the SPcod are deleted.

The COC marker and the QCC marker do not exist even though the image is a color image. But in a case where the COC marker and the QCC marker exist, an operation similar to the operation with respect to the decomposition level of the COD marker segment may be carried out with respect to the decomposition level of the COC marker segment, and an operation similar to the operation with respect to the QOD marker segment may be carried out with respect to the QCC marker segment.

Accordingly, the code having the marker segment SIZ or the like within the header information rewritten, is output to the target object. By subjecting the code after the rewriting of the header information to a decoding process including the wavelet inverse transform of the JPEG2000, the number of decomposition levels that are decoded become partial even though the code itself other than the header information remains in the original state, and an image having a deteriorated resolution level, that is, an image having a reduced multiplication factor (or magnification) is reproduced.

FIGS. 32A and 32B are diagrams for explaining images before and after the number of decomposition levels is changed. FIG. 32A shows the original image having 3 decomposition levels. On the other hand, FIG. 32B shows the image having 2 decomposition levels, which is obtained by decoding the code having the header information related to the number of resolution levels, such as the marker segment SIZ, rewritten.

EXAMPLE 3

In this particular example, the progressive order of the code is the CPRL order, and the number of components is to be reduced by n. FIG. 33 is a diagram for explaining an original code of Example 3 added with a tag representation. The input original code is an annotated code having an image size of 16×16 pixels, 4 layers, a resolution level 3, 3 components, and a precinct size equal to a sub-band size (that is, so-called maximum precinct), with CPRL progressive (pg of SGcod is pg=04).

When generating a code having the number of components reduced by n, where n=2, for example, for this original code, the step S2 shown in FIG. 25 simply needs to rewrite the header information by reducing the value of the SIZ tag Lsiz within the header information by 3n=6 so that the Lsiz is rewritten from "002F" to "0029", the value of the Csiz is reduced by n=2 so that the Csiz is rewritten from "0003" to "0001", the Ssiz, XRsiz (indicated as XR in the original code shown in FIG. 33) and YRsiz (indicated as YR in the original code shown in FIG. 33) amounting to n=2 components, that is, "07", "01", "01", "07", "01" and "01", are deleted, and the component transform (ct in FIG. 33) of the SGcod of the COD tag is appropriately replaced by "0" if "1" and maintained to "0" if originally "0", as surrounded by a rectangle in FIG. 34. FIG. 34 is a diagram for explaining the code after rewriting the header information.

According to the specifications of the JPEG2000, the component transform is carried out only with respect to the first 3 components. For example, if the component transform of the SGcod of the COD tag may be maintained to "1" if the first 3 components within the 4 components are to be maintained, but needs to be changed to "0" if only some of the 3 components are to be maintained. This is the reason why the component transform of the SGcode of the COD tag is appropriately replaced as described above.

Accordingly, the code having the marker segment SIZ or the like within the header information rewritten, is output to the target object. By subjecting the code after the rewriting of the header information to a decoding process including the wavelet inverse transform of the JPEG2000, the components that are decoded become partial even though the code itself other than the header information remains in the original state, and an image obtained by converting the color image into a monochrome image is reproduced.

Figure 35A:
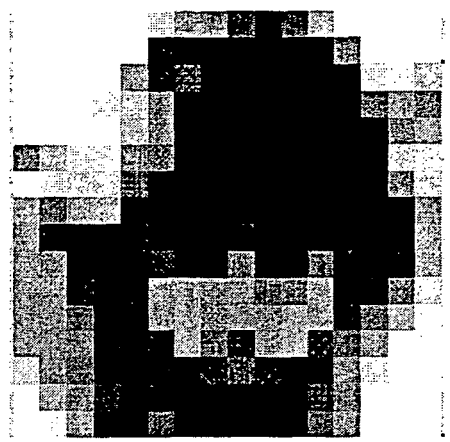
FIGS. 35A and 35B are diagrams for explaining images before and after the number of components is changed.
Figure 35B:
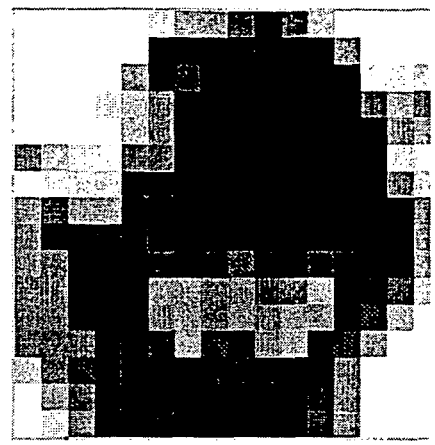

FIGS. 35A and 35B are diagrams for explaining images before and after the number of components is changed. FIG. 35A shows the original image having 3 components. On the other hand, FIG. 35B shows the image having 1 component, which is obtained by decoding the code having the header information related to the number of components rewritten. Although FIGS. 35A and 35B are both indicated as monochrome images for the sake of convenience, FIG. 35A shows the original color image having 3 components, and FIG. 35B shows the monochrome image having 1 component.

EXAMPLE 4

In this particular example, the number of tiles is to be reduced by n, regardless of the progressive order. FIG. 36 is a diagram for explaining an original code of Example 4 added with a tag representation. The input original code is an annotated code having an image size of 16×16 pixels, a tile size of 8×8 pixels (=a total of 4 tiles), 4 layers, a resolution level 2, 3 components, and a precinct size equal to a sub-band size (that is, so-called maximum precinct), with LRCP progressive (pg of SGcod is pg=00).

When generating a code having the number of tiles reduced by n, where n=2, for example, for this original code, the step S2 shown in FIG. 25 simply needs to rewrite the header information. By reducing the value of Ysiz of the SIZ tag within the header information to ½ times so that "0000 0010" is rewritten to "0000 0008", as surrounded by a rectangle in FIG. 37, the number of tiles is reduced to ½ times. FIG. 37 is a diagram for explaining the code after rewriting the header information. Alternatively, the values of the Xsiz and Ysiz may be appropriately rewritten so that the number of tiles becomes a desired value.

Accordingly, the code having the Ysiz related to the image size or the like within the header information rewritten, is output to the target object. By subjecting the code after the rewriting of the header information to a decoding process including the wavelet inverse transform of the JPEG2000, the number of tiles that are decoded become partial even though the code itself other than the header information remains in the original state, and an image having a reduced number of tiles is reproduced.

FIGS. 38A and 38B are diagrams for explaining images before and after the number of tiles is changed. FIG. 38A shows the original image having 4 tiles. On the other hand, FIG. 38B shows the image having 2 tiles, which is obtained by decoding the code having the header information related to the number of tiles, that is, the information Ysiz related to the image size, rewritten.

EXAMPLE 5

This particular example is a modification of the Example 4 described above. In this particular example, the header information is rewritten by reducing the value of Ysiz of the SIZ tag within the header information to ½ times so that the Ysiz is rewritten from "0000 0010" to "0000 0008", and the tile numbers 0 and 1 of the Isot of the SOT marker are interchanged, as shown in FIG. 39. FIG. 39 is a diagram for explaining a code of Example 5 after rewriting the header information.

Accordingly, the code having the Ysiz and the Isot related to the image size or the like within the header information rewritten, is output to the target object. By subjecting the code after the rewriting of the header information to a decoding process including the wavelet inverse transform of the JPEG2000, the number of tiles that are decoded become partial even though the code itself other than the header information remains in the original state, and an image having a reduced number of tiles is reproduced.

Figure 40A:
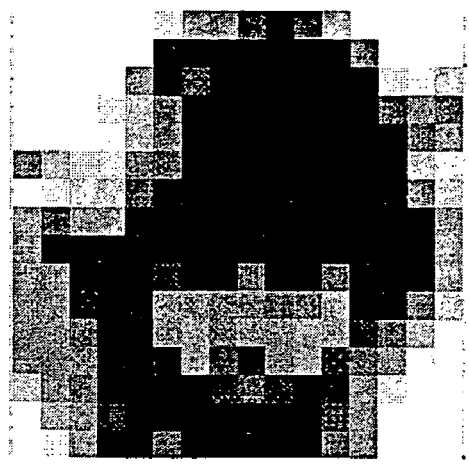
FIGS. 40A and 40B are diagrams for explaining images before and after changing the number of tiles and the tile number.
Figure 40B:

FIGS. 40A and 40B are diagrams for explaining images before and after the number of tiles is changed. FIG. 40A shows the original image having 4 tiles. On the other hand, FIG. 40B shows the image having 2 tiles, which is obtained by decoding the code having the header information related to the number of tiles, that is, the information Ysiz and Isot related to the image size, rewritten. Unlike the case shown in FIG. 38B, the image is reproduced with the right and left sides of the image reversed as shown in FIG. 40B due to the rewriting of the tile numbers.

EXAMPLE 6

In this particular example, the progressive order of the code is the LRCP order, and the image is to be enlarged, that is, the resolution level is to be increased to a high resolution of $2^n$ times. FIG. 41 is a diagram for explaining a binary representation of an original code of Example 6, and FIG. 42 is a diagram for explaining the original code added with a tag representation. The input original code is an annotated code having an image size of 16×16 pixels, 1 layer, a resolution level 1, with LRCP progressive. FIG. 41 shows the binary representation for the lossless code of a monochrome image, and FIG. 42 shows the markers in brackets "[ ]" to show the marker arrangement.

In this case, the COC marker and the QCC marker do not exist because the image is a monochrome image. But in a case where the COC marker and the QCC marker exist, an operation similar to the operation with respect to the decomposition level of the COD marker segment may be carried out with respect to the decomposition level of the COC marker segment, and an operation similar to the operation with respect to the QOD marker segment may be carried out with respect to the QCC marker segment.

When generating a code having the number of resolution levels increased by $2^n$ times, that is, by 2 times when n=1, for example, for this original code, the step S2 shown in FIG. 25 simply needs to rewrite the header information, so that the Xsiz, Ysiz, XTsiz and YTsiz of the SIZ tag related to the image size and the tile size within the header information are multiplied by $2^n=2$ and each of the Xsiz, Ysiz, XTsiz and YTsiz are rewritten from "0000 0010" to "0000 0020", the number of decomposition levels of the SPcod of the COD tag is increased by n=1 and rewritten from "01" to "02", the value of the Lqcd of the QCD tag is increased by 3n=3 from "07" to "0A", and the entry (this entry may have any value because it is not used) of the SPqcd of the QCD tag is increased by 3n=3 bytes and added with "48", "48" and "50", for example, as surrounded by a rectangle in FIG. 43. FIG. 43 is a diagram for explaining the code after rewriting the header information.

Depending on the decoder used, the desired operation may be carried out even if the above described rewriting, namely, increasing the value of the Lqcd by 3n and increasing the entry by 3n bytes. This is because, the value (level) of the SPcod of the COD tag is analyzed and decoded with a priority over the value of the Lqcd and the number of entries of the SPqcd, depending on the decoder.

Accordingly, the code having the information such as the Xsiz, Ysiz, XTsiz and YTsiz related to the image size within the header information rewritten, is output to the target object. By subjecting the code after the rewriting of the header information to a decoding process including the wavelet inverse transform of the JPEG2000, the number of resolution levels that are decoded and subjected to the wavelet inverse transform increases even though the code itself other than the header information remains in the original state, and an image having a high resolution is reproduced.

In other words, with respect to the code having the header information rewritten in the above described manner, the decoder analyzes the code amounting to the original decomposition level 1 as the code amounting to the decomposition level 2, and analyzes that the code amounting to the decomposition level 1 is discarded at the time of forming the code and does not exist. As a result, the image having a size which is $2^n$ times, that is, a resolution level which is $2^n$ times, is generated.

As described above, the "for" loop corresponding to the progressive order is repeated, and if it is written within the main header that "the decomposition level is 2 (=resolution levels 0 to 2 exist)", the decoder attempts to decode the code up to "the resolution level 2". However, since the decoder will reach the EOC before reaching the code having the resolution level 2, the decoder analyzes in this case that the code having "the resolution level 2" was discarded at the time of forming the code and originally did not exist. In addition, since it is written that "the decomposition level is 2 (=3 resolution levels exist)", the wavelet inverse transform is repeated 2 times, and the resolution level becomes doubled as a result. This substantially has the effect of repeating the "for" loop an extra time.

When increasing the number of resolution levels, the header information which is rewritten needs to be the number of elements substantially at the highest level of the progressive order, and the header information related to the elements, for reasons similar to those described above. Of course, since it is difficult to assume the effect of repeating the loop of the LCP an extra time, only the resolution level is substantially effective. But similarly as in the case described above, it is possible to prevent a correct decoding from being carried out by rewriting the header information-including the number of elements substantially at the highest level of the progressive order and the header information related to the elements.

In addition, when generating a code having the number of resolution levels increased by $2^n$ times, that is, by 4 times when n=2, for example, for this original code, the step S2 shown in FIG. 25 simply needs to rewrite the header information, so that the Xsiz, Ysiz, XTsiz and YTsiz of the SIZ tag related to the image size and the tile size within the header information are multiplied by $2^n$=4 and each of the Xsiz, Ysiz, XTsiz and YTsiz are rewritten from "0000 0010" to "0000 0040", the number of decomposition levels of the SPcod of the COD tag is increased by n=2 and rewritten from "01" to "03", the value of the Lqcd of the QCD tag is increased by 3n=6 from "07" to "0D", and the entry (this entry may have any value because it is not used) of the SPqcd of the QCD tag is increased by 3n=6 bytes and added with "50", "48", "48", "50", "48"and "48", for example, as surrounded by a rectangle in FIG. 44. FIG. 44 is a diagram for explaining the code after a different rewriting the header information.

Figure 45D:
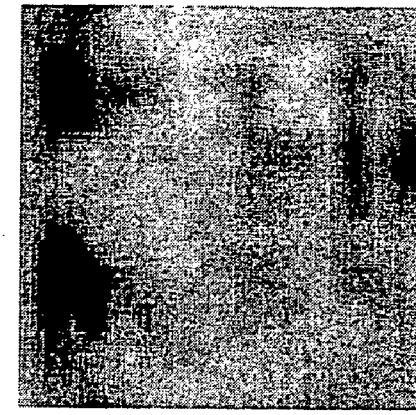
FIGS. 45A through 45D are diagrams for explaining images before and after changing the number of layers.
Figure 45C:
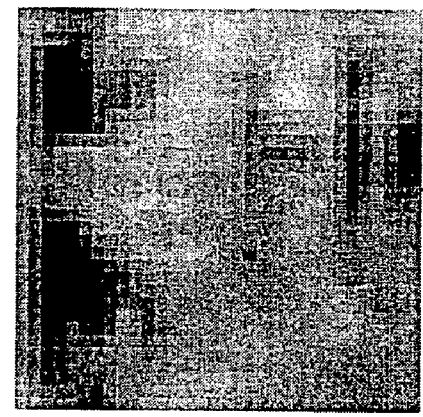
Figure 45B:
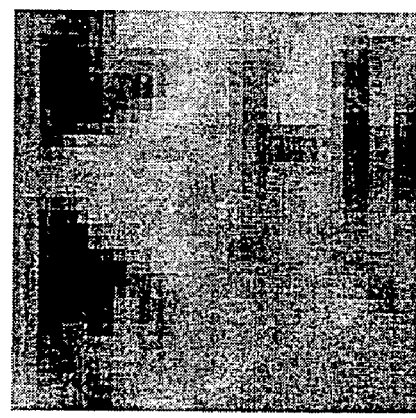
Figure 45A:
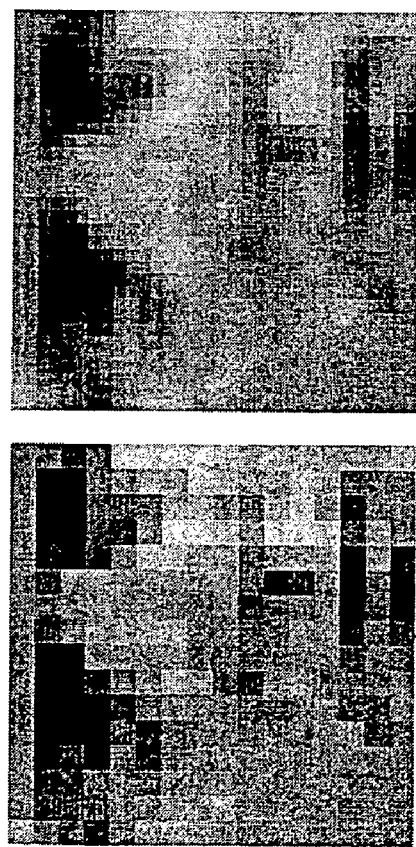

FIGS. 45A through 45D are diagrams for explaining images before and after changing the number of layers. In other words, FIGS. 45A through 45D show the images for explaining the images which are generated when the code having the rewritten header information is decoded. FIG. 45A shows the original image having 16×16 pixels. FIG. 45B shows the image having 32×32 pixels which is obtained by enlarging the original image according to the third order interpolation method (cubic convolution method). FIG. 45C shows the image having 32×32 pixels which is obtained by increasing the resolution level by two times according to the code having the header information rewritten as shown in FIG. 43. Further, FIG. 45D shows the image having 64×64 pixels which is obtained by increasing the resolution level by 4 times according to the code having the header information rewritten as shown in FIG. 44.

The third order interpolation method (cubic convolution method) is generally an interpolation method which obtains the highest picture quality. However, it may be seen from FIGS. 45B through 45D that the image obtained by increasing the resolution level has a sufficiently high picture quality even when compared to that obtained by the cubic convolution method.

Therefore, the process of rewriting the header information as described above may be summarized by the following steps:

(1) In a case where the elements in the highest level of the progressive order are the layers (L) and the header information to be rewritten is related to the number of layers, the header information is rewritten to reduce by n the number of layers of the marker segment SGcod of the default coding style marker (COD), in order to reduce the number of layers by n.

(2) In a case where the elements in the highest level of the progressive order are the resolution levels (R) and the header information to be rewritten is related to the image size, the tile size, the number of resolution levels and the number of bit planes for every sub-band to be encoded, the header information is rewritten to reduce the image size (Xsiz, Ysiz) and the tile size (XTsiz, YTsiz) to $\frac{1}{2^n}$ times, the number of resolution levels (SPcod or SPcoc) is reduced by n, the precinct size (Lqcd or Lqcc) is reduced by 3n, and the entry (SPqcd or SPqcc) related to the number of bit planes for every sub-band to be encoded and amounting to 3n bytes is deleted, in order to reduce the resolution level to $\frac{1}{2^n}$ times.

(3) The step (2) is sufficient in the case of the maximum precinct. But in the case of the user-defined precinct, the header information is rewritten so as to include information related to the precinct size, the Lcod or Lcoc is reduced by n, and the precinct size of the SPcod or SPcoc is deleted by an amount corresponding to n bytes.

(4) In a case where the elements in the highest level of the progressive order are the number of components (C) and the header information to be rewritten is related to the number of components and the sub-sampling for every component, the header information is rewritten to reduce the value of the marker segment Lsiz of the size marker (SIZ) by 3n, reduce the value of the marker segment Csiz by n, and delete an amount corresponding to n components with respect to the marker segments Ssiz, XRsiz and YRsiz, in order to reduce the number of components by n.

(5) When subjected to the component transform in the step (4), the header information is rewritten to include information related to the existence of the component transform. In other words, when the component transform is made, the content of the color transformation of the marker segment SGcod of the default coding style marker (COD) is appropriately rewritten to 0 as the information related to the existence of the component transform.

(6) When changing the number of tiles, the header information related to the image size is rewritten regardless of the-progressive order. When reducing the number of tiles to be decoded, the values of the XRsiz and YRsiz within the size marker (SIZ) are appropriately rewritten to desired values.

(7) The tile number can be appropriately changed by including the marker segment Isot forming the tile number of the tile start marker (SOT) in the header information which is to be rewritten, and appropriately rewriting the marker segment Isot.

(8) In a case where the elements in the highest level of the progressive order are the resolution level (R) and the header information to be rewritten is related to the image size, the tile size and the number of resolution levels, the header information is rewritten to increase the image size (Xsiz, Ysiz) and the tile size (XTsiz, YTsiz) by $2^n$ times and the number of resolution levels (level of SPcod or SPcoc) is increased by n, in order to increase the resolution level by $2^n$ times.

According to this embodiment, the code information other than the necessary header information is maintained in the original state. For this reason, if the rewritten header information is rewritten again back to the original state, it is possible to restore the code back to the state of the original code and decode the original code to obtain the original image.

Although not shown, the code information which is no longer the target of the partial decoding due to the rewriting of the header information, may be deleted, so as to reduce the code size.

Next, a description will be given of the process of changing the resolution level for an enlargement or reduction which is not a multiple of 2 to the Nth power ($2^N$). According to the discrete wavelet transform and discrete wavelet inverse transform of the JPEG2000, which are resolution transform methods for high picture quality, it is possible to change the multiplication factor which is 2 to the Nth power ($2^N$) solely by the decomposition level. But this resolution transform method cannot be employed when the multiplication factor is not 2 to the Nth power ($2^N$). Accordingly, when the desired multiplication factor is not 2 to the Nth power ($2^N$), the header information is rewritten as described above for a resolution level so that the resolution level becomes a multiple of 2 to the Nth power ($2^N$) closest to the desired multiplication factor but multiplied to the resolution level to obtain a desired resolution level. Thereafter, the insufficient enlargement or reduction is made by an interpolation method using interpolation or decimation. As a result, it is possible to realize a high picture quality even in a case where a simple multiplication function such as the simple nearest neighbor method is employed.

Figure 46:
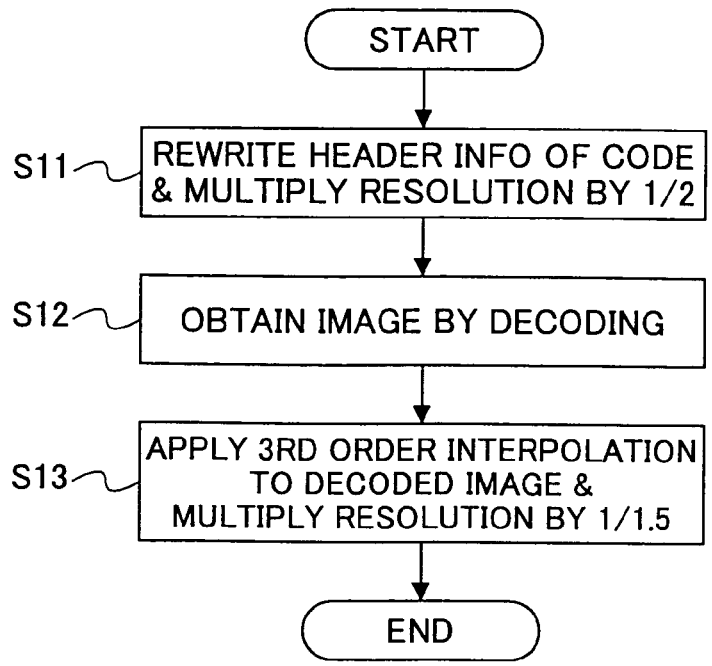
FIG. 46 is a flow chart for explaining a process of making the resolution level 1/3 times.

A description will be given of a process of making the resolution level ⅓ times, for example. FIG. 46 is a flow chart for explaining this process of making the resolution level ⅓ times. First, a step S11 rewrites only the header information of the target code in the manner described above, so that the multiplication factor becomes a multiple of 2 to the Nth power ($N=-1$ and $2^N=½$ ($=½''$)) in this case) which is close to the desired multiplication factor of ⅓, so as to generate the code having the resolution level ½. A step S12 decodes the code having the rewritten header information, so as to obtain the image in which the resolution level is ½ times. A step S13 carries out a known interpolation method, such as the simple nearest neighbor method, with respect to the decoded image, so as to decimate and adjust the resolution level by an amount corresponding to ¹⁄₁.₅ times. As a result, it is possible to obtain an image having the resolution level which is ⅓ times that of the original image.

Similarly, when making the resolution level ⅕ times, the resolution level is first made ¼ times, and a decimation amounting to ¹⁄₁.₂₅ times is made thereafter. When making the resolution level ⅐ times, the resolution level is first made ⅛ times, and an interpolation amounting to 1.125 times is made thereafter. The resolution level can be multiplied by a desired multiplication factor in a similar manner.

Accordingly, the step S11 carries out the process to function as a header information rewriting means (or section), the step S12 carries out the process to function as a decoding means (or section), and the step S13 carries out the process to function as a final multiplication factor adjusting means (or section).

Figure 47:
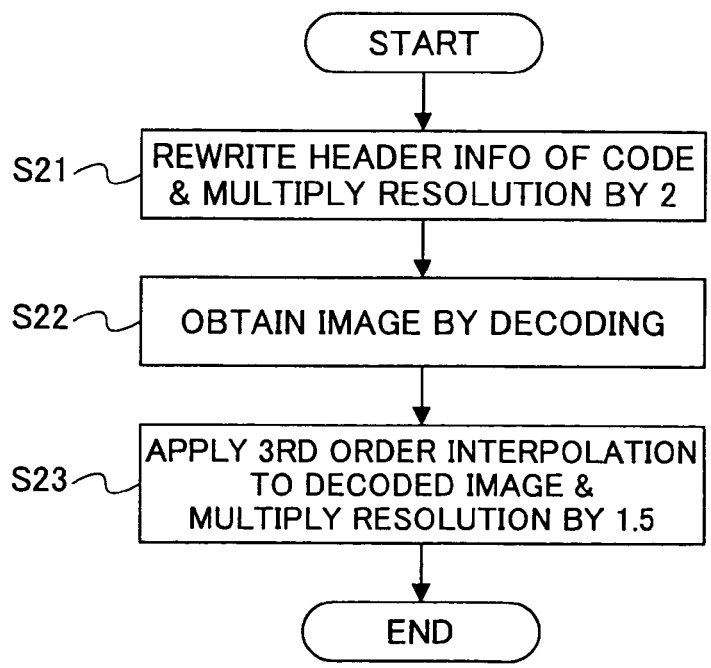
FIG. 47 is a flow chat for explaining a process of making the resolution level 3 times.

Next, a description will be given of a process of making the resolution level 3 times, for example. FIG. 47 is a flow chart for explaining this process of making the resolution level 3 times. First, a step S21 rewrites only the header information of the target code in the manner described above, so that the multiplication factor becomes a multiple of 2 to the Nth power ($N=1$ and $2^N=2$ ($=2''$)) in this case) which is close to the desired multiplication factor of 3, so as to generate the code having the resolution level of 2 times. A step S22 decodes the code having the rewritten header information, so as to obtain the image in which the resolution level is 2 times. A step S23 carries out a known interpolation method, such as the simple nearest neighbor method, with respect to the decoded image, so as to interpolate and adjust the resolution level by an amount corresponding to 1.5 times. As a result, it is possible to obtain an image having the resolution level which is 3 times that of the original image.

Alternatively, the step S21 may rewrite only the header information of the target code in the manner described above, so that the multiplication factor becomes a multiple of 2 to the Nth power ($N=2$ and $2^N=4$ ($=2''$)) in this case) which is close to the desired multiplication factor of 3, so as to generate the code having the resolution level of 4 times. The step S22 may decode the code having the rewritten header information, so as to obtain the image in which the resolution level is 4 times. The step S23 may carry out a known interpolation method, such as the simple nearest neighbor method, with respect to the decoded image, so as to decimate and adjust the resolution level by an amount corresponding to ¹⁄₁.₅ times. As a result, it is also possible in this case to obtain an image having the resolution level which is 3 times that of the original image.

Hence, the step S21 carries out the process to function as a header information rewriting means (or section), the step S22 carries out the process to function as a decoding means (or section), and the step S23 carries out the process to function as a final multiplication factor adjusting means (or section).

According to the discrete wavelet transform and discrete wavelet inverse transform of the JPEG2000, which are resolution transform methods for high picture quality, it is possible to change the multiplication factor which is 2 to the Nth power ($2^N$) solely by the decomposition level. But this resolution transform method cannot be employed when the multiplication factor is not 2 to the Nth power ($2^N$). Accordingly, when the desired multiplication factor is not 2 to the Nth power ($2^N$), the header information is rewritten as described above for a resolution level so that the resolution level becomes a multiple of 2 to the Nth power ($2^N$) closest to the desired multiplication factor but multiplied to the resolution level to obtain a desired resolution level. Thereafter, the insufficient enlargement or reduction is made by an interpolation method using interpolation or decimation. As a result, it is possible to realize a high picture quality even in a case where a simple multiplication function such as the simple neighbor point method is employed.

Further, the present invention is not limited to these embodiments, but various variations and modifications may be made without departing from the scope of the present invention.

What is claimed is:

1. A code conversion apparatus comprising:
input means for inputting a code sequence having a JPEG2000 coding format and including code data and header information that is progressively arranged with respect to one of resolution levels, layers, components and positions;
header information rewriting means for rewriting information related to one of the resolution levels, the layers, the components and the positions of the header information in the code sequence, so as to partially decode the code sequence that is input by said input means with respect to one of the resolution levels, the layers, the components and the positions; and
output means for outputting the code sequence, including the header information that is rewritten by said header information rewriting means, to a target object.

2. A code conversion apparatus comprising:
an input section configured to input a code sequence having a JPEG2000 coding format and including code data and header information that is progressively arranged with respect to one of resolution levels, layers, components and positions;
a header information rewriting section configured to rewrite information related to one of the resolution levels, the layers, the components and the positions of the header information in the code sequence, so as to partially decode the code sequence that is input by said input section with respect to one of the resolution levels, the layers, the components and the positions; and an output section configured to output the code sequence, including the header information that is rewritten by said header information rewriting section, to a target object.

3. The code conversion apparatus as claimed in claim 2, wherein the code sequence has been subjected to a discrete wavelet transform.

4. The code conversion apparatus as claimed in claim 2, wherein the header information rewritten by said header information rewriting section includes a number of elements in a highest level of a progressive order and information related to the elements.

5. The code conversion apparatus as claimed in claim 4, wherein the elements in the highest level of the progressive order are layers (L), and the header information to be rewritten includes information related to a number of the layers.

6. The code conversion apparatus as claimed in claim 5, wherein said header information rewriting section rewrites the header information to reduce by n a number of layers of a marker segment SGcod of a default coding style marker (COD) within the header information when reducing the number of layers by n.

7. The code conversion apparatus as claimed in claim 4, wherein the elements in the highest level of the progressive order are resolution levels (R), and the header information to be rewritten is information related to an image size, a tile size, a number of resolution levels and a number of bit planes for every sub-band to be encoded.

8. The code conversion apparatus as claimed in claim 7, wherein the header information includes information related to a precinct size when a precinct is user defined.

9. The code conversion apparatus as claimed in claim 7, wherein said header information rewriting section multiplies $\frac{1}{2}^n$ to the image size and the tile size, reduces the number of resolution levels by n, reduces the precinct size by 3n, and deletes entries amounting to 3n bytes and related to the number of bit planes for every sub-band to be encoded, when multiplying the resolution level by $\frac{1}{2}^n$.

10. The code conversion apparatus as claimed in claim 7, wherein said header information rewriting section rewrites only header information for a resolution level so that the resolution level becomes a multiple of 2 to the Nth power ($2^N$) closest to a desired multiplication factor which is not 2 to the Nth power ($2^N$) but multiplied to the resolution level to obtain a desired resolution level, and further comprising:

a decoding section configured to decode the code sequence including the rewritten header information; and a final multiplication factor adjusting section configured to adjust an image obtained by said decoding section so as to have the desired resolution level, based on an interpolation method using interpolation or decimation.

11. The code conversion apparatus as claimed in claim 4, wherein the elements in the highest level of the progressive order are a number of components (C), and the header information to be rewritten includes a number of components and information related to sub-sampling for every component.

12. The code conversion apparatus as claimed in claim 11, wherein the header information to be rewritten includes information related to existence of a component transform when the code sequence has been subjected to component transform.

13. The code conversion apparatus as claimed in claim 11, wherein said header information rewriting section reduces by 3n a value of a marker segment Lsiz of a size marker (SIZ) within the header information, reduces by n a value of a marker segment Csiz, and deletes an amount corresponding to n components with respect to marker segments Ssiz, XRsiz and Rsiz when reducing the number of components by n.

14. The code conversion apparatus as claimed in claim 13, wherein said header information rewriting section rewrites to 0 a content of a marker segment SGcod of a default coding style marker (COD) within the header information, as information related to existence of component transform, when the code sequence has been subjected to component transform.

15. The code conversion apparatus as claimed in claim 2, wherein said header information rewriting section rewrites header information related to image size.

16. The code conversion apparatus as claimed in claim 15, wherein said header information rewriting section rewrites header information including a marker segment Isot indicating a tile number of a tile start marker (SOT).

17. The code conversion apparatus as claimed in claim 2, further comprising:

a code deleting section configured to delete a code which is no longer a target of a partial decoding due to rewriting of the header information by said header information rewriting section.

18. A code conversion method comprising the steps of:

(a) inputting a code sequence having a JPEG2000 coding format and including code data and header information that is progressively arranged with respect to one of resolution levels, layers, components and positions;

(b) rewriting information related to one of the resolution levels, the layers, the components and the positions of the header information in the code sequence, so as to partially decode the code sequence that is input by said step (a) with respect to one of the resolution levels, the layers, the components and the positions; and (c) outputting the code sequence, including the header information that is rewritten by said step (b), to a target object.

19. The code conversion method as claimed in claim 18, wherein the code sequence has been subjected to a discrete wavelet transform.

20. The code conversion method as claimed in claim 18, wherein the header information rewritten by said step (b) includes a number of elements in a highest level of a progressive order and information related to the elements.

21. The code conversion method as claimed in claim 20, wherein the elements in the highest level of the progressive order are layers (L), and the header information to be rewritten includes information related to a number of the layers.

22. The code conversion method as claimed in claim 20, wherein the elements in the highest level of the progressive order are resolution levels (R), and the header information to be rewritten is information related to an image size, a tile size, a number of resolution levels and a number of bit planes for every sub-band to be encoded.

23. The code conversion method as claimed in claim 22, wherein the header information includes information related to a precinct size when a precinct is user defined.

24. The code conversion method as claimed in claim 20, wherein the elements in the highest level of the progressive order are a number of components (C), and the header information to be rewritten includes a number of components and information related to sub-sampling for every component.

25. The code conversion method as claimed in claim 24, wherein the header information to be rewritten includes information related to existence of a component transform when the code sequence has been subjected to component transform.

26. The code conversion method as claimed in claim 18, wherein said step (b) rewrites header information related to image size.

27. The code conversion method as claimed in claim 26, wherein said step (b) rewrites header information including a marker segment Isot indicating a tile number of a tile start marker (SOT).

28. The code conversion method as claimed in claim 18, further comprising the steps of:
(d) deleting a code which is no longer a target of a partial decoding due to rewriting of the header information by said step (b).

29. A computer-readable storage medium which stores a program for causing a computer to carry out a code conversion process, said program comprising:
an input procedure causing the computer to input a code sequence having a JPEG2000 coding format and including code data and header information that is progressively arranged with respect to one of resolution levels, layers, components and positions;
a header information rewriting procedure causing the computer to rewrite information related to one of the resolution levels, the layers, the components and the positions of the header information in the code sequence, so as to partially decode the code sequence that is input by said input procedure with respect to one of the resolution levels, the layers, the components and the positions; and
an output procedure causing the computer to output the code sequence, including the header information that is rewritten by said header information rewriting procedure, to a target object.

30. The computer-readable storage medium as claimed in claim 29, wherein the code sequence has been subjected to a discrete wavelet transform.

31. The computer-readable storage medium as claimed in claim 30, wherein said program further comprises:
a deleting procedure causing the computer to delete a code which is no longer a target of a partial decoding due to rewriting of the header information by said header information rewriting procedure.

32. The computer-readable storage medium as claimed in claim 29, wherein the header information rewritten by said header information rewriting procedure includes a number of elements in a highest level of a progressive order and information related to the elements.

33. The computer-readable storage medium as claimed in claim 32, wherein the elements in the highest level of the progressive order are layers (L), and the header information to be rewritten includes information related to a number of the layers.

34. The computer-readable storage medium as claimed in claim 32, wherein the elements in the highest level of the progressive order are resolution levels (R), and the header information to be rewritten is information related to an image size, a tile size, a number of resolution levels and a number of bit planes for every sub-band to be encoded.

35. The computer-readable storage medium as claimed in claim 34, wherein the header information includes information related to a precinct size when a precinct is user defined.

36. The computer-readable storage medium as claimed in claim 32, wherein the elements in the highest level of the progressive order are a number of components (C), and the header information to be rewritten includes a number of components and information related to sub-sampling for every component.

37. The computer-readable storage medium as claimed in claim 36, wherein the header information to be rewritten includes information related to existence of a component transform when the code sequence has been subjected to component transform.

38. The computer-readable storage medium as claimed in claim 29, wherein said header information rewriting procedure rewrites header information related to image size.

39. The computer-readable storage medium as claimed in claim 38, wherein said rewriting step includes rewriting header information including a marker segment Isot indicating a tile number of a tile start marker (SOT).

40. A code conversion apparatus comprising:
an input section configured to input compressed and transformed input codes;
a header information rewriting section configured to rewrite only header information within the codes so as to partially decode the input codes; and
an output section configured to output the codes, including rewritten header information, to a target object,
wherein the header information rewritten by said header information rewriting section includes a number of elements in a highest level of a progressive order and information related to the elements.

41. A computer-readable storage medium which stores a program for causing a computer to carry out a code conversion process, said process comprising:
inputting compressed and transformed input codes;
rewriting only header information within the codes so as to partially decode the input codes; and
outputting the codes, including rewritten header information, to a target object,
wherein the rewritten header information includes a number of elements in a highest level of a progressive order and information related to the elements.

* * * * *